(12) United States Patent
Hurtubise et al.

(10) Patent No.: US 6,315,580 B1
(45) Date of Patent: Nov. 13, 2001

(54) PCB CONNECTOR MODULE FOR PLUG-IN CIRCUIT BREAKERS AND FUSES

(75) Inventors: Gilles Hurtubise, Vaudreuil-Dorion; Emilio Stinziani, Calgary; Imad S. Ghanem, Dollard-des-Ormeaux, all of (CA)

(73) Assignee: Astec International Limited (HK)

( * ) Notice: Subject to any disclaimer, the term of this patent is extended or adjusted under 35 U.S.C. 154(b) by 0 days.

(21) Appl. No.: 09/326,737

(22) Filed: Jun. 4, 1999

(51) Int. Cl.$^7$ .................................................. H01R 12/00
(52) U.S. Cl. ........................... 439/82; 361/634; 361/673; 361/627; 439/716
(58) Field of Search ............................... 439/82, 83, 716, 439/79; 361/673, 627, 628, 631, 634, 637, 644, 648, 652

(56) References Cited

U.S. PATENT DOCUMENTS

| | | |
|---|---|---|
| 4,002,388 | 1/1977 | Menocal . |
| 4,138,179 | 2/1979 | Miller et al. . |
| 4,358,810 | 11/1982 | Wafer et al. . |
| 4,797,110 | 1/1989 | Ponziani et al. . |
| 4,822,287 | 4/1989 | Lanchet . |
| 4,886,462 | 12/1989 | Fierro . |
| 5,125,854 | 6/1992 | Bassler et al. . |
| 5,184,961 | 2/1993 | Ramirez et al. . |
| 5,502,286 | 3/1996 | Pollman et al. . |
| 5,513,995 | 5/1996 | Kurotori et al. . |
| 5,638,225 | 6/1997 | Bobadilla et al. . |
| 5,709,574 | 1/1998 | Bianca et al. . |
| 5,712,779 | * 1/1998 | Sheppard et al. ................... 361/634 |
| 5,726,852 | 3/1998 | Trifiletti et al. . |
| 5,796,060 | 8/1998 | Fuchsle et al. . |
| 5,847,921 | * 12/1998 | Kim ................................... 361/634 |
| 5,853,305 | 12/1998 | Bedrossian et al. . |
| 5,894,405 | 4/1999 | Fleege et al. . |
| 6,002,580 | * 12/1999 | LeVantine et al. .................. 361/634 |
| 6,062,914 | * 5/2000 | Fasano ................................. 439/716 |

* cited by examiner

Primary Examiner—Tho D. Ta
(74) Attorney, Agent, or Firm—Coudert Brothers

(57) ABSTRACT

A connector module for overcurrent protection devices uses a printed circuit board substrate as a support surface for line and load busbar members and auxiliary signal clip connectors disposed on one side of the substrate. Passageways in the substrate enable male current plugs to extend through the substrate to mate with sockets disposed in the busbars. Additional passageways enable auxiliary contact terminals to extend through the substrate. Clip connectors disposed on the substrate are used to make electrical contact to the auxiliary terminals. In a preferred embodiment, the sockets and clips are shaped and dimensioned to mate with the current and alarm contact terminals of a plug-in circuit breaker.

15 Claims, 17 Drawing Sheets

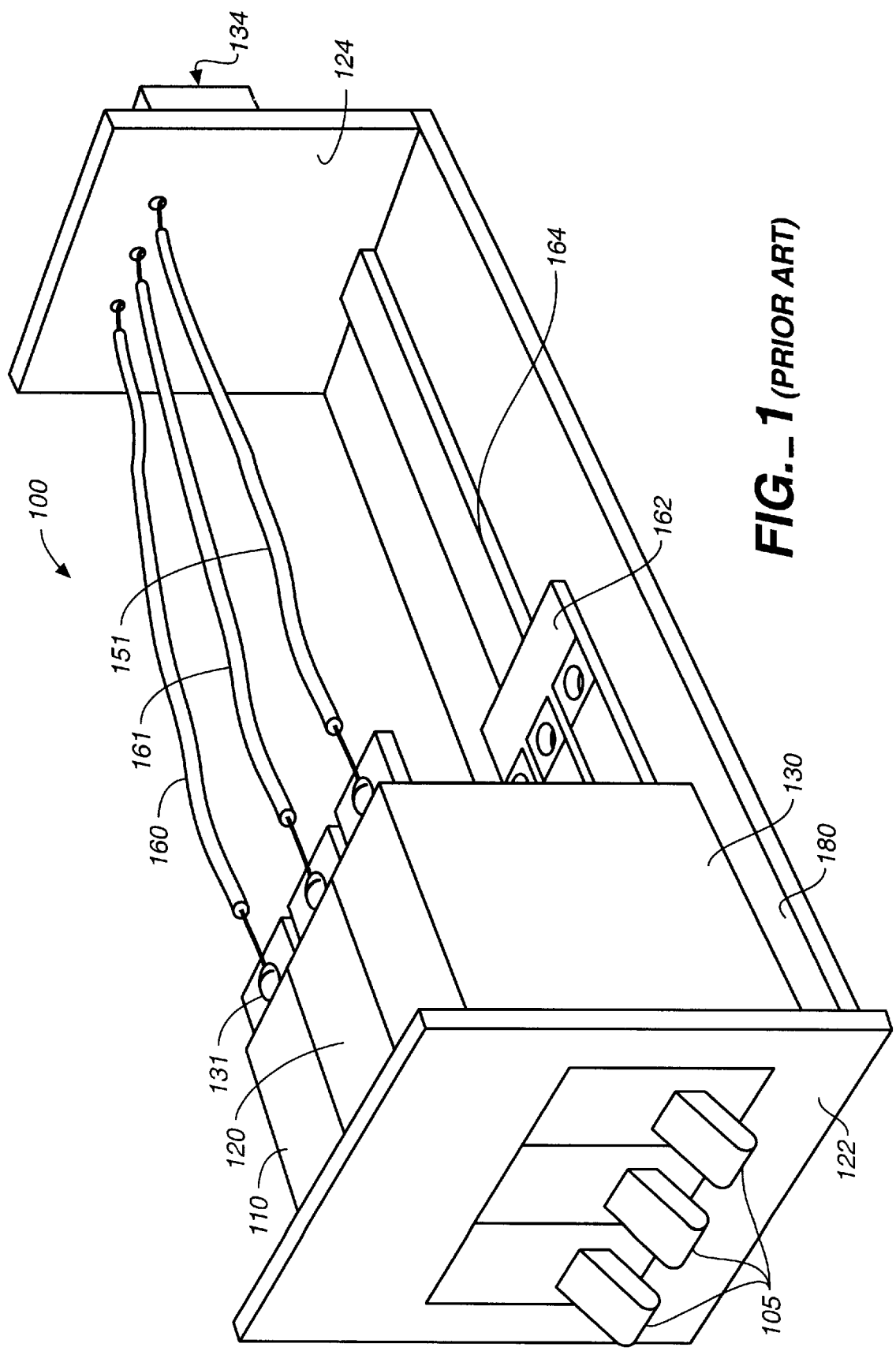
FIG._1 (PRIOR ART)

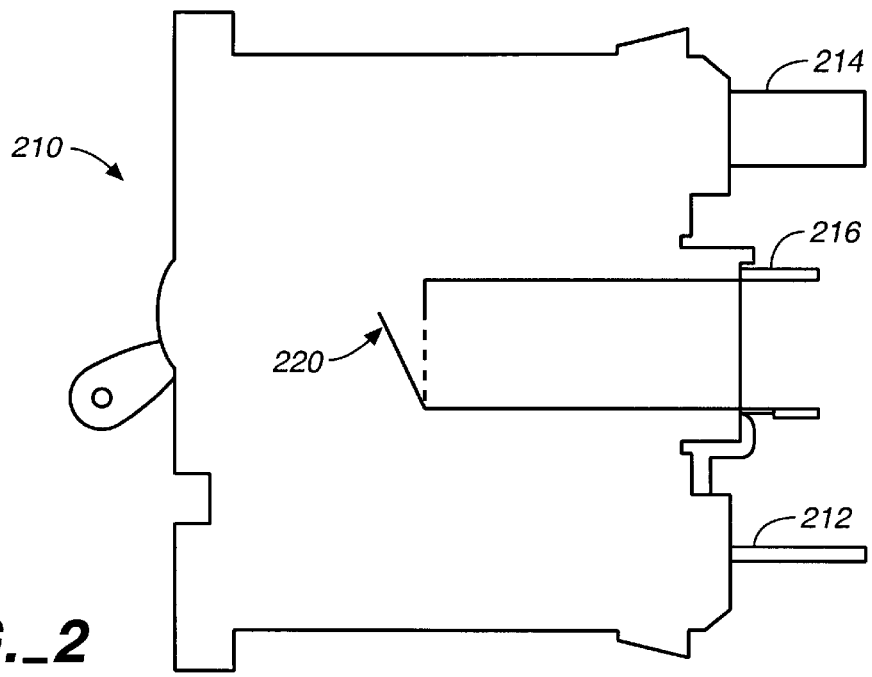
FIG._2
*(PRIOR ART)*
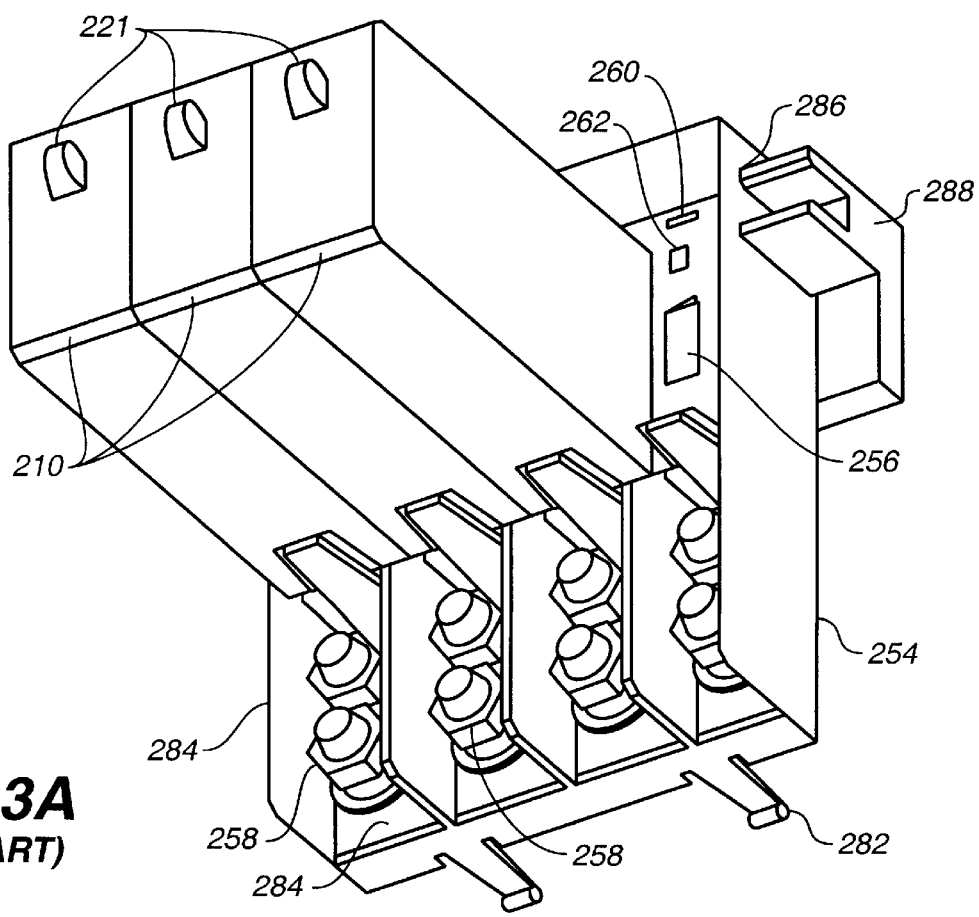
FIG._3A
*(PRIOR ART)*

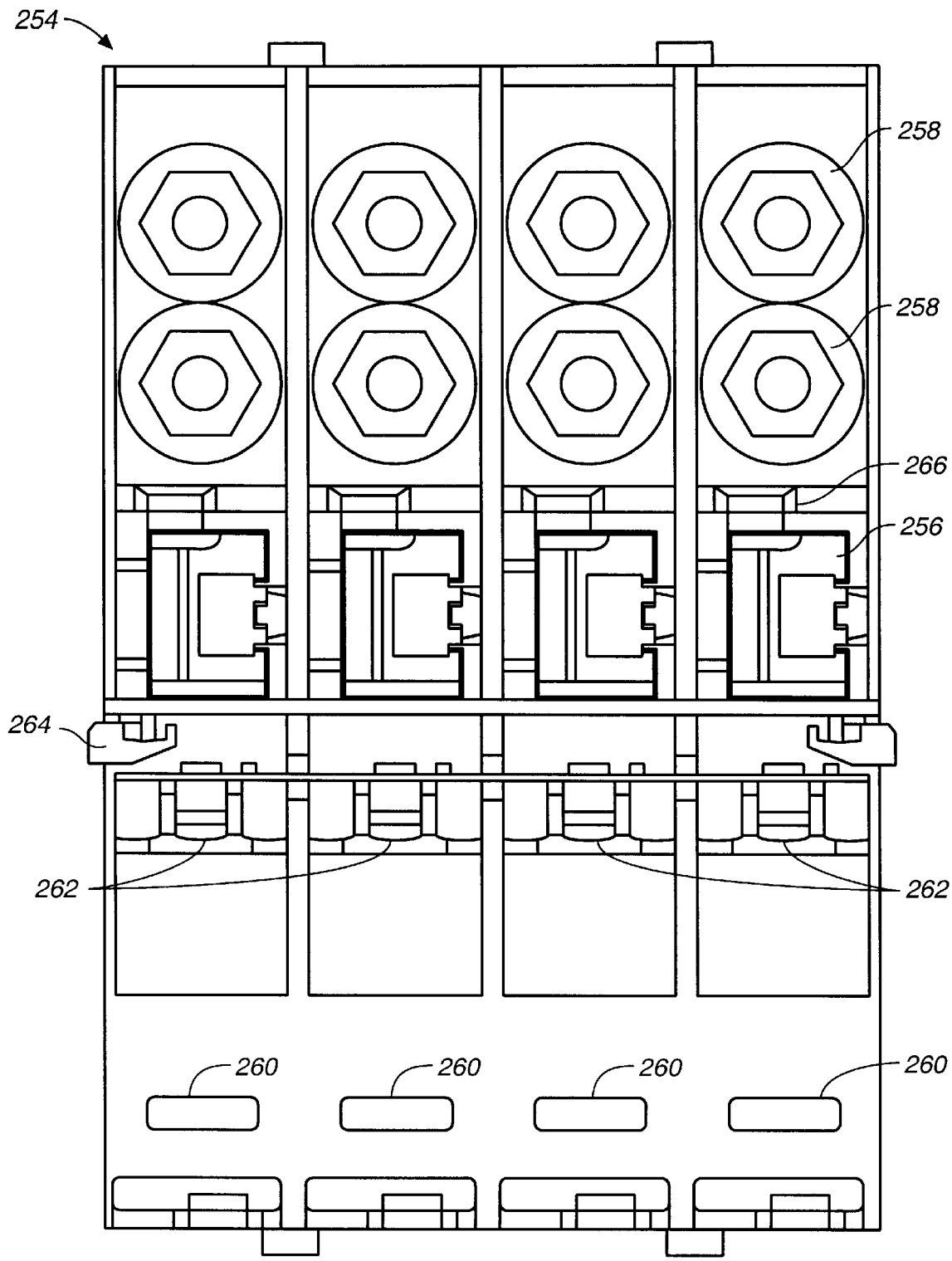
FIG._3B (PRIOR ART)

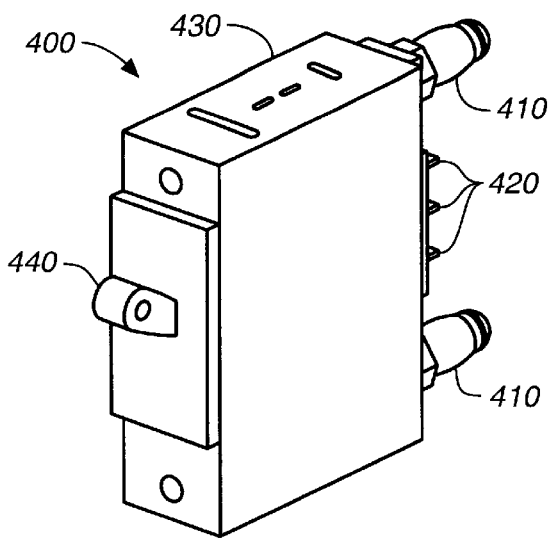
FIG._4
(PRIOR ART)
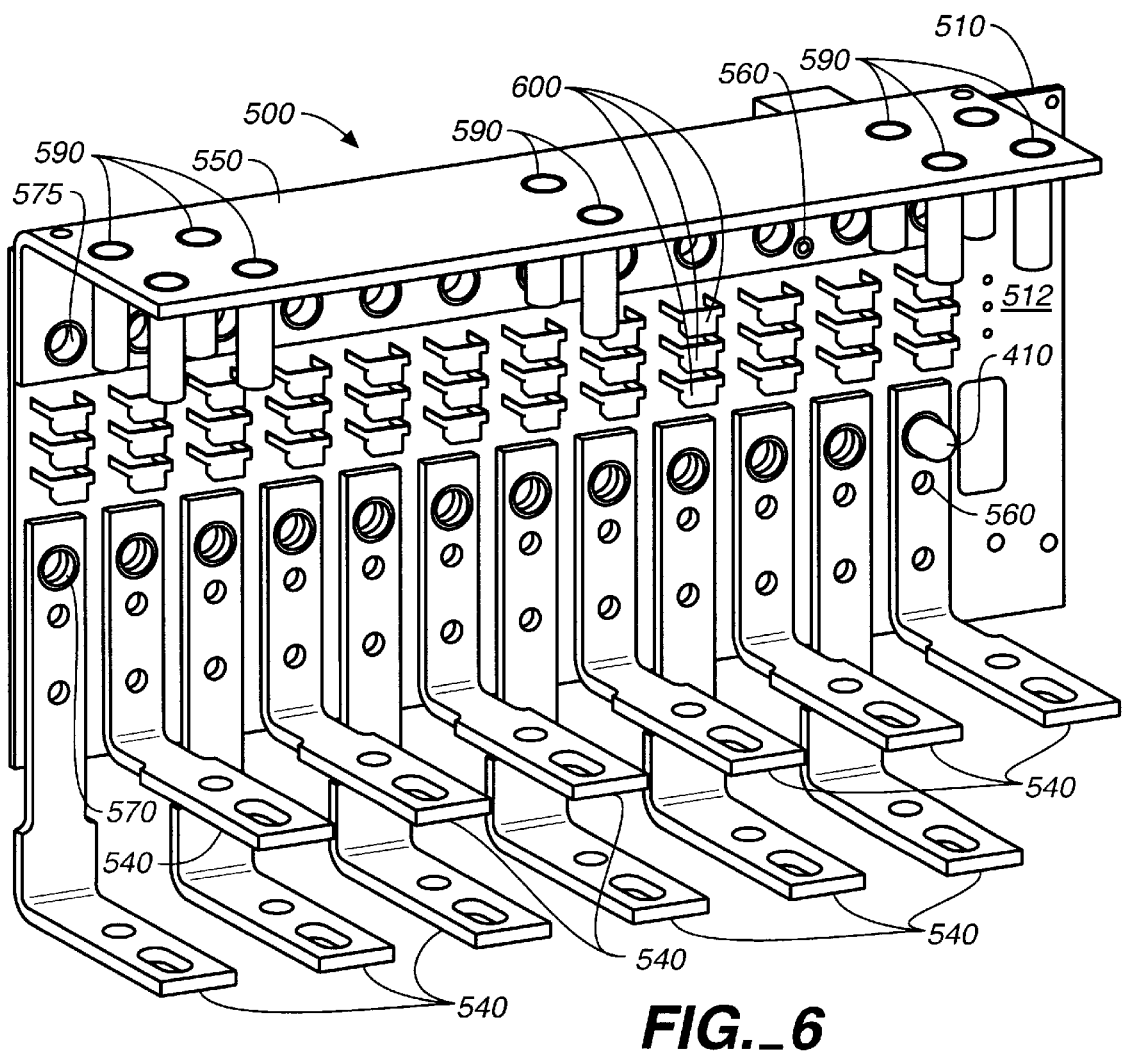
FIG._6

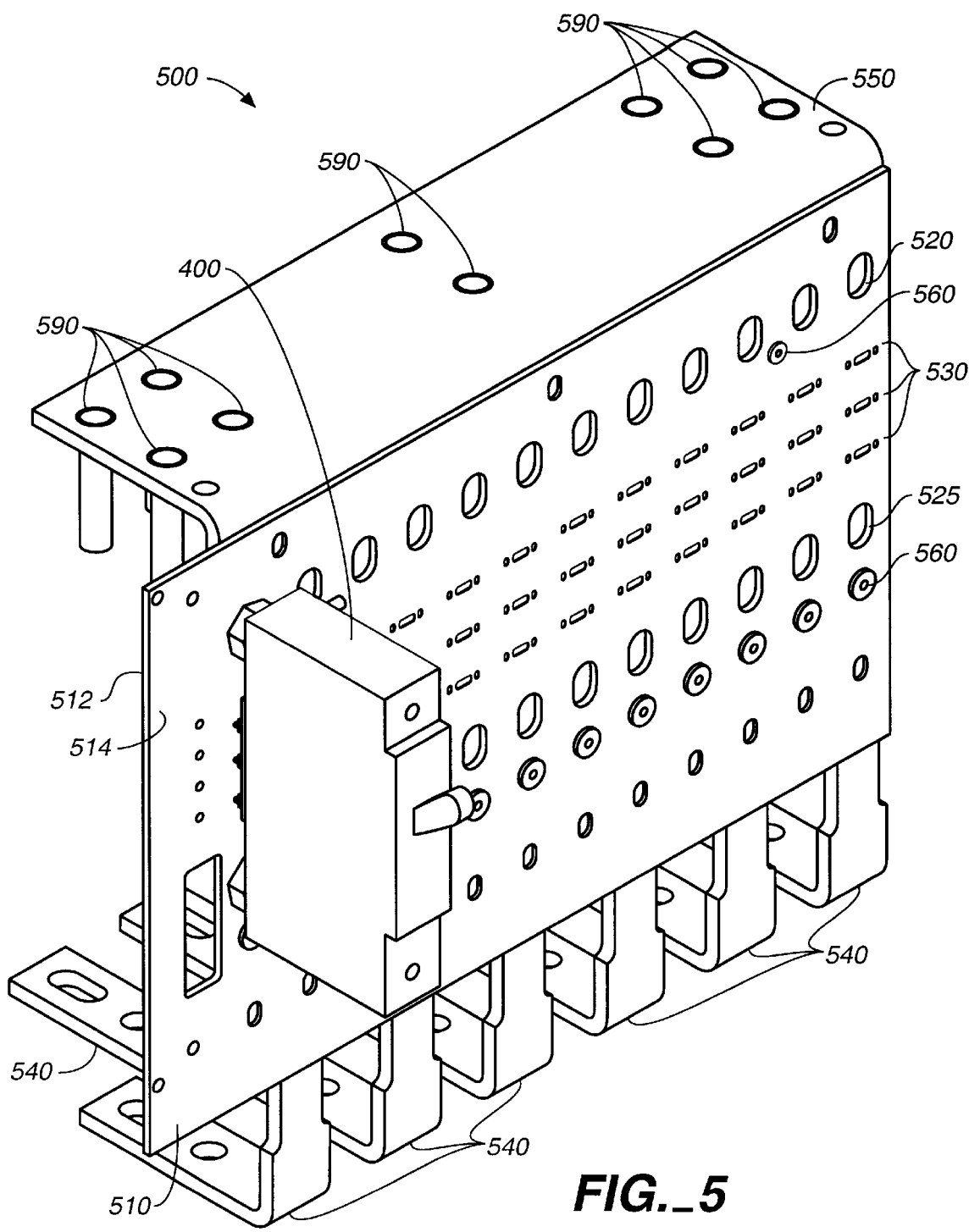
FIG._5

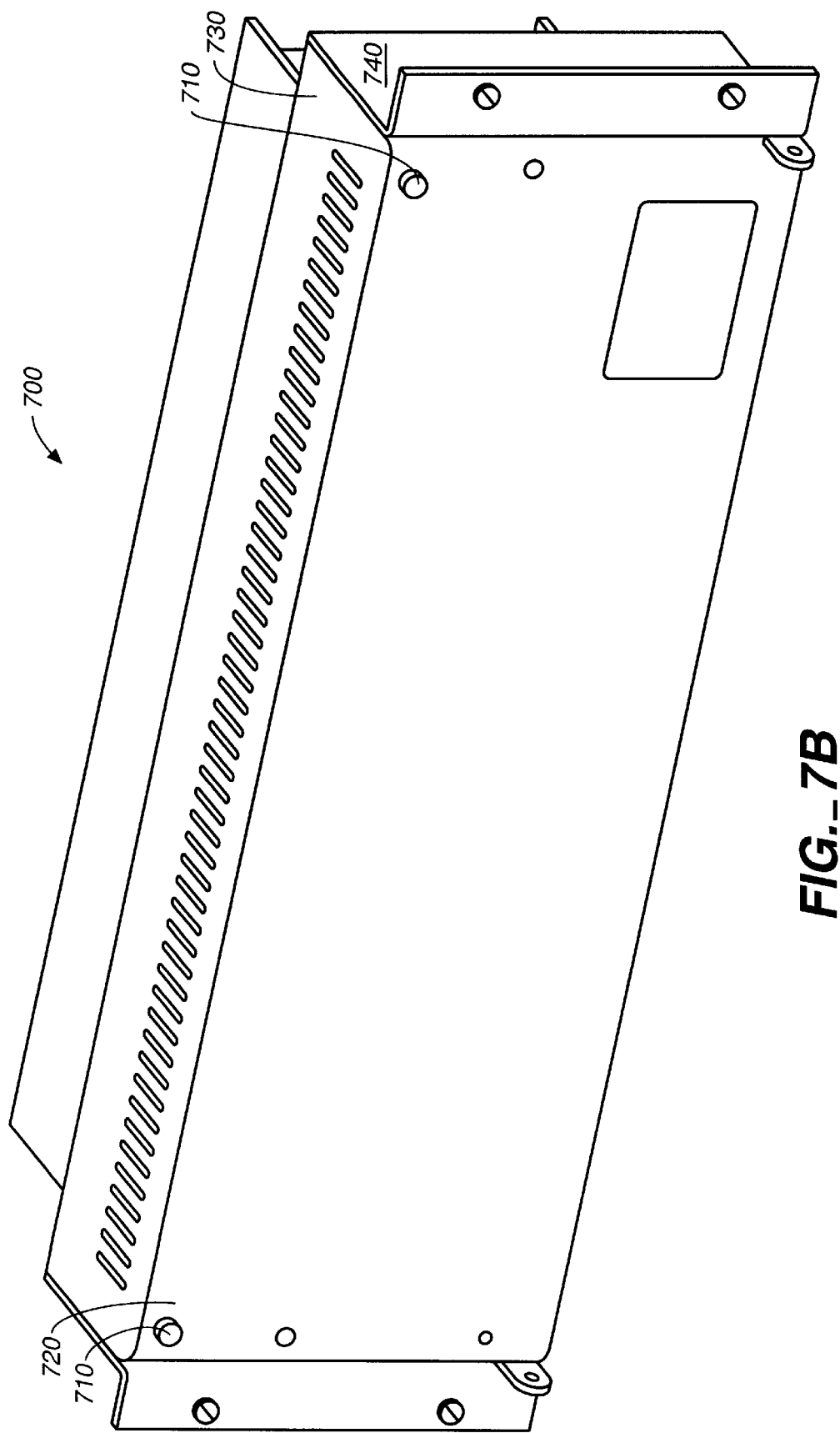
FIG._7B

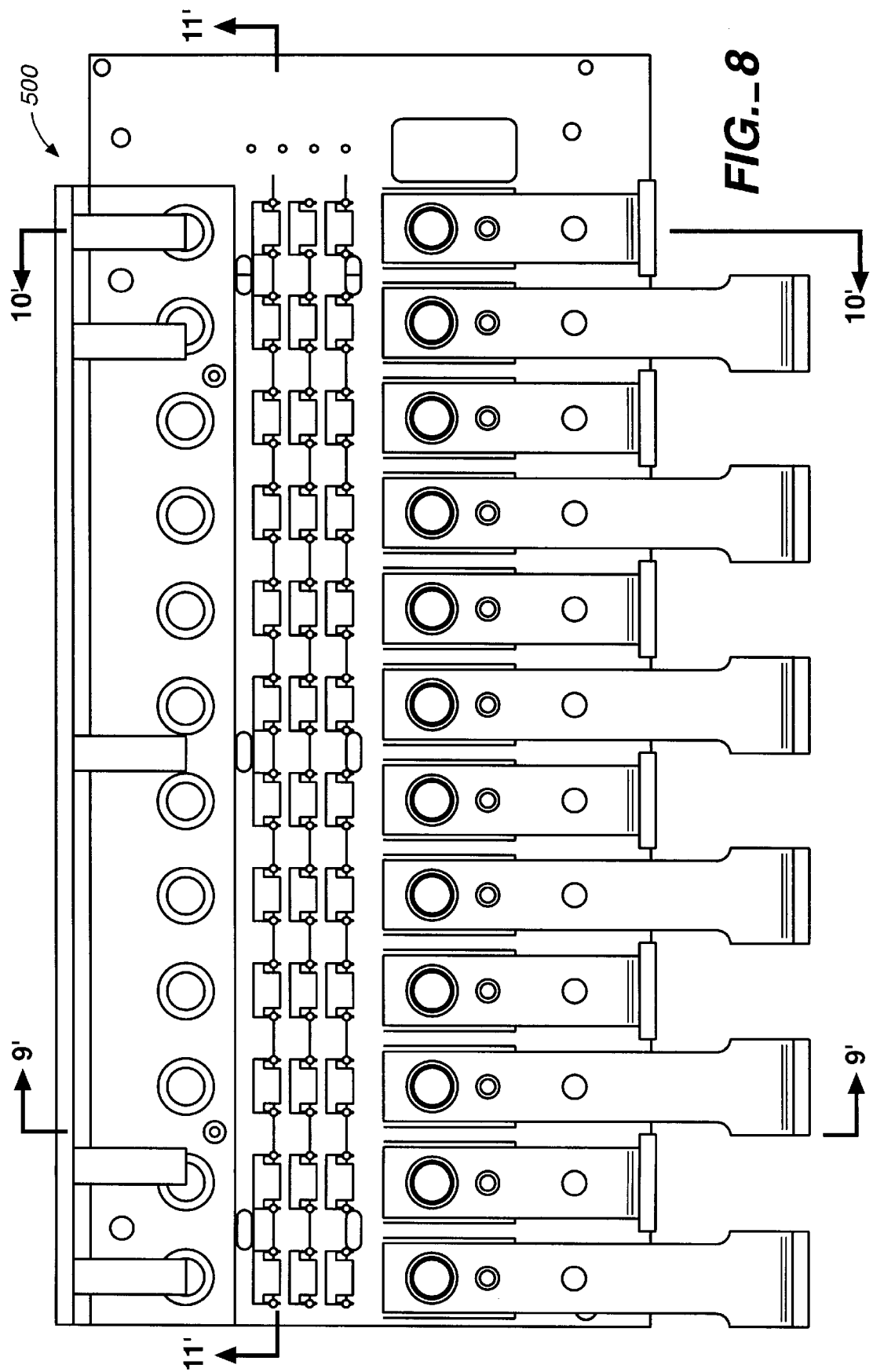
FIG._8

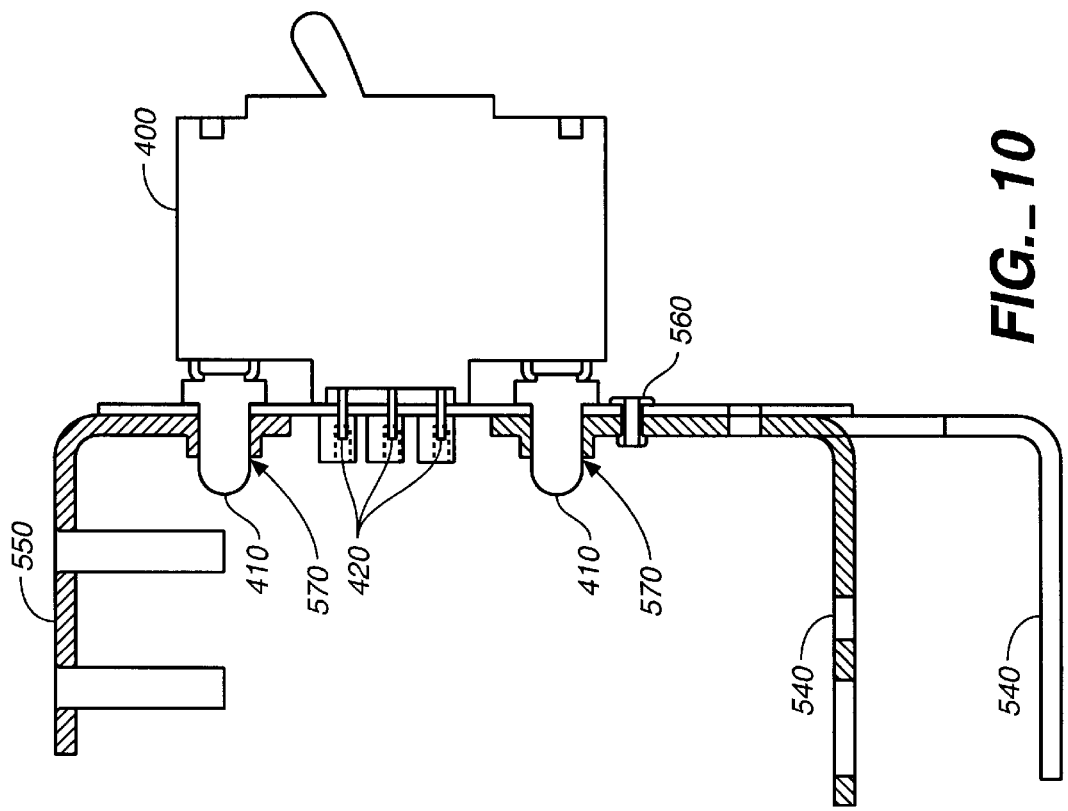
*FIG._10*
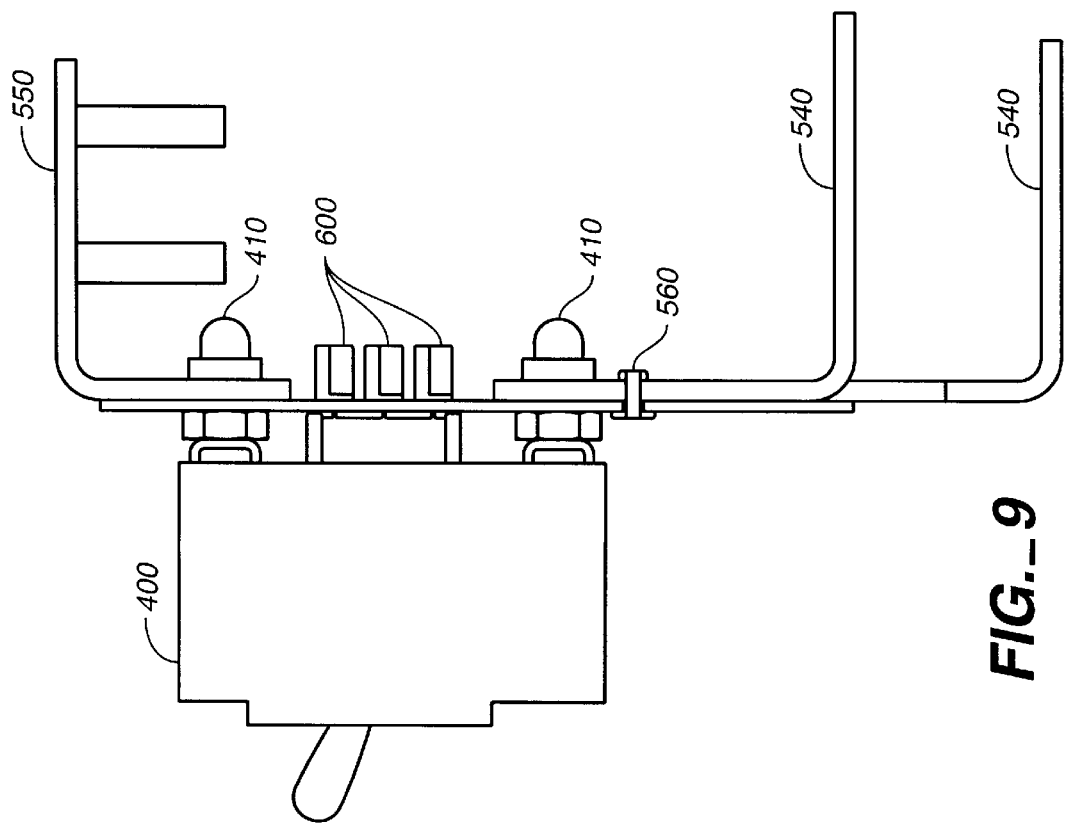
*FIG._9*

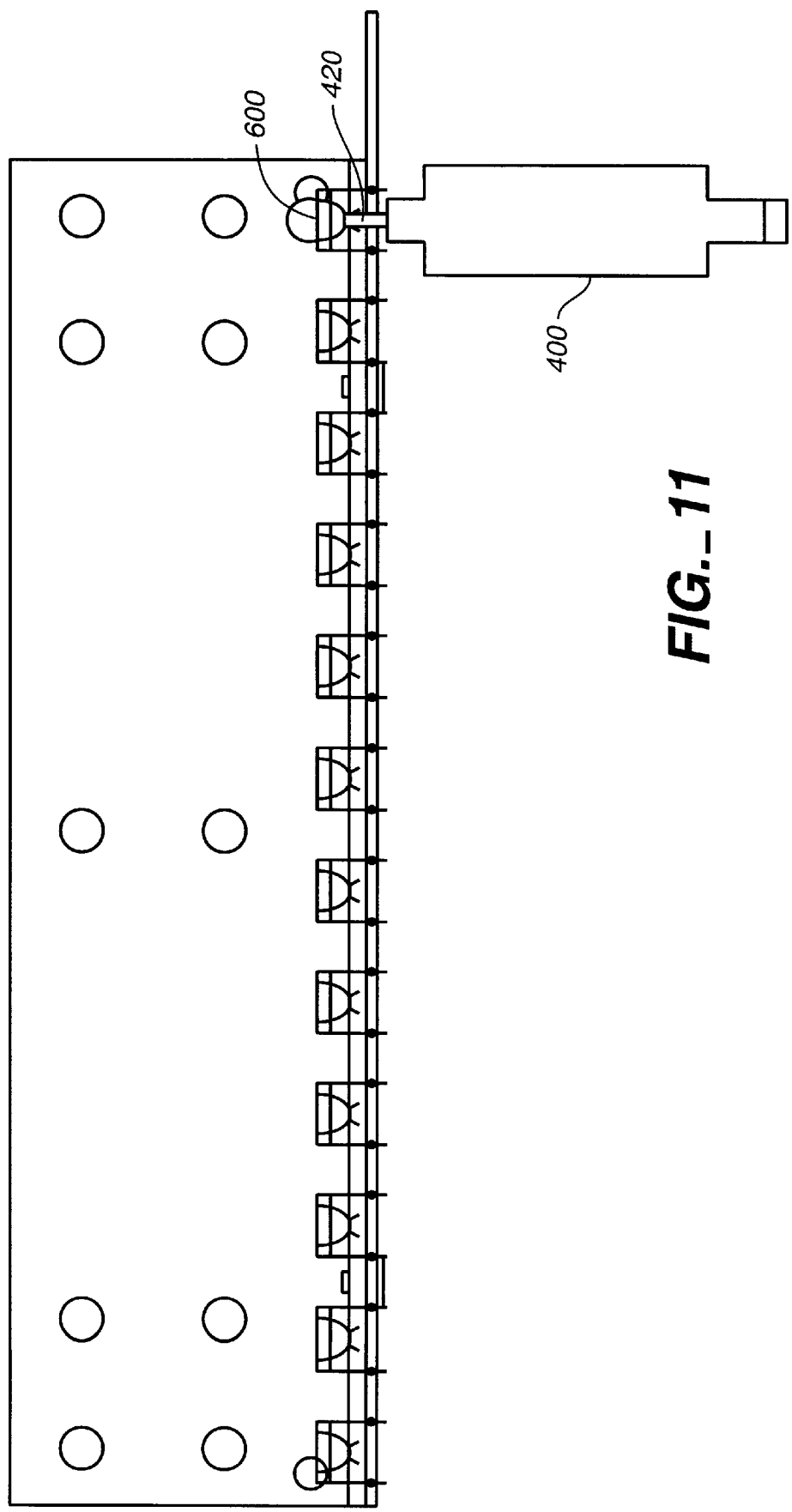

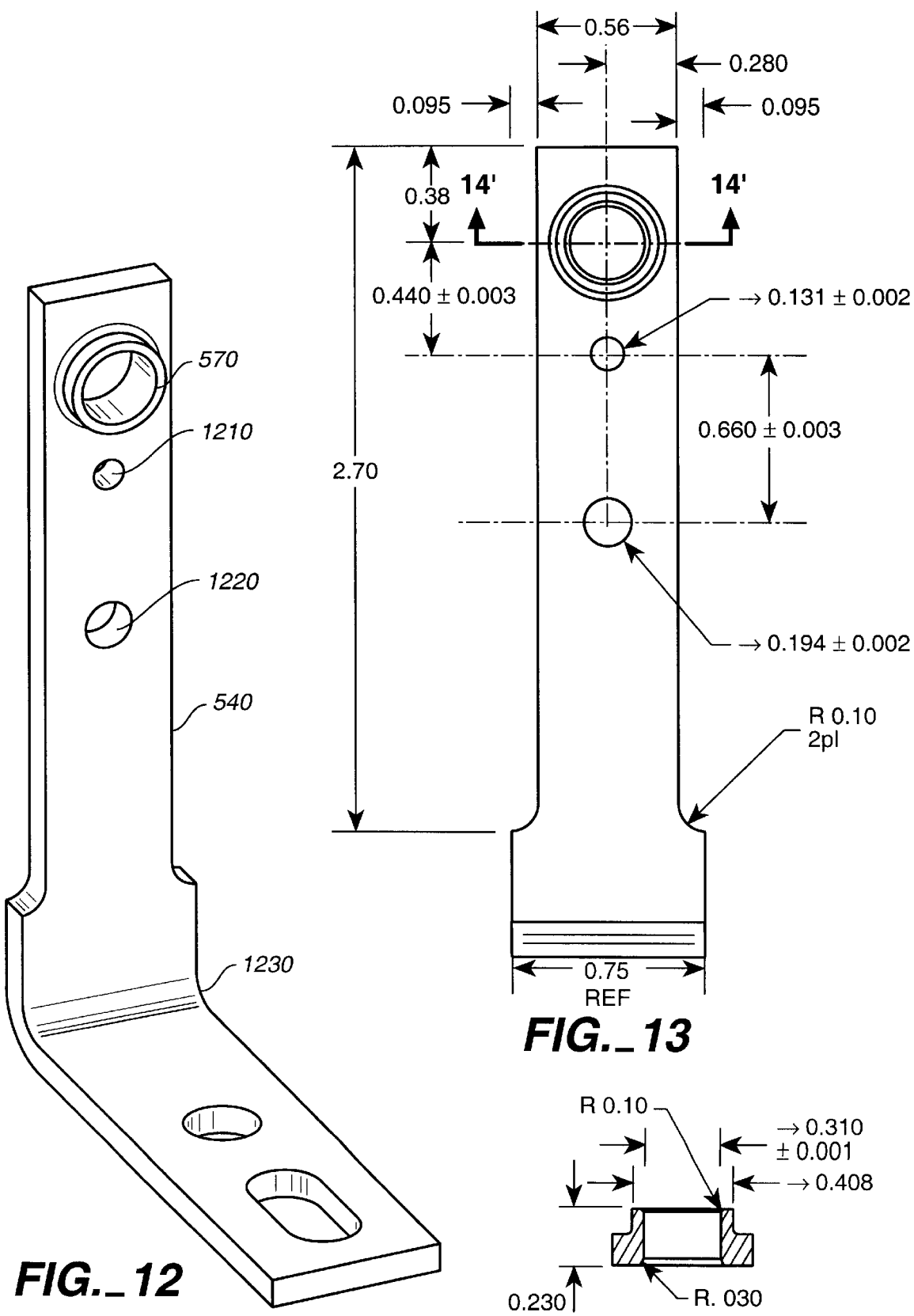

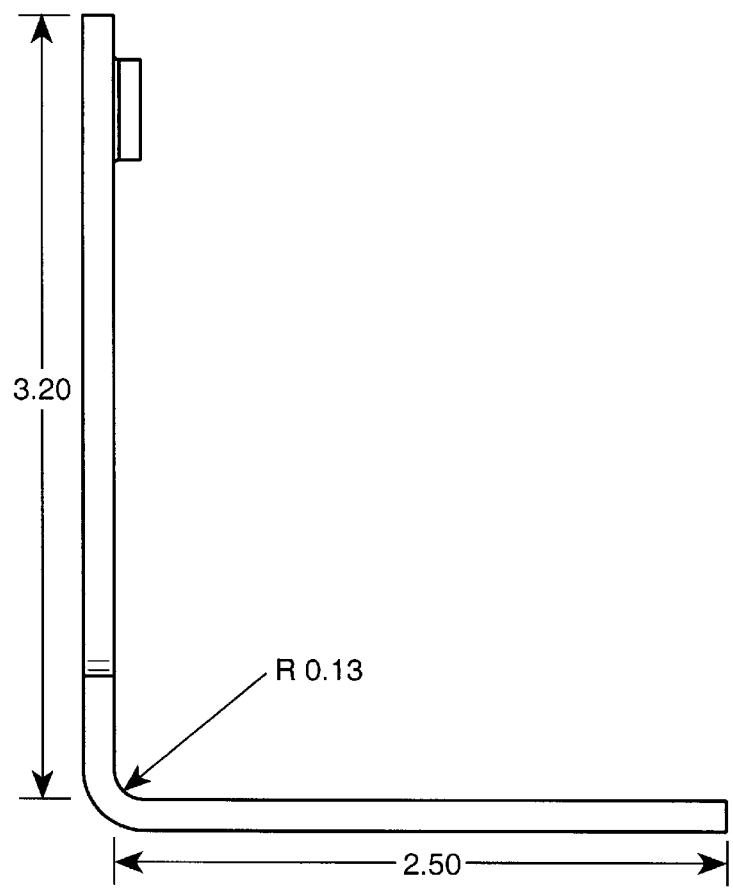
FIG._15
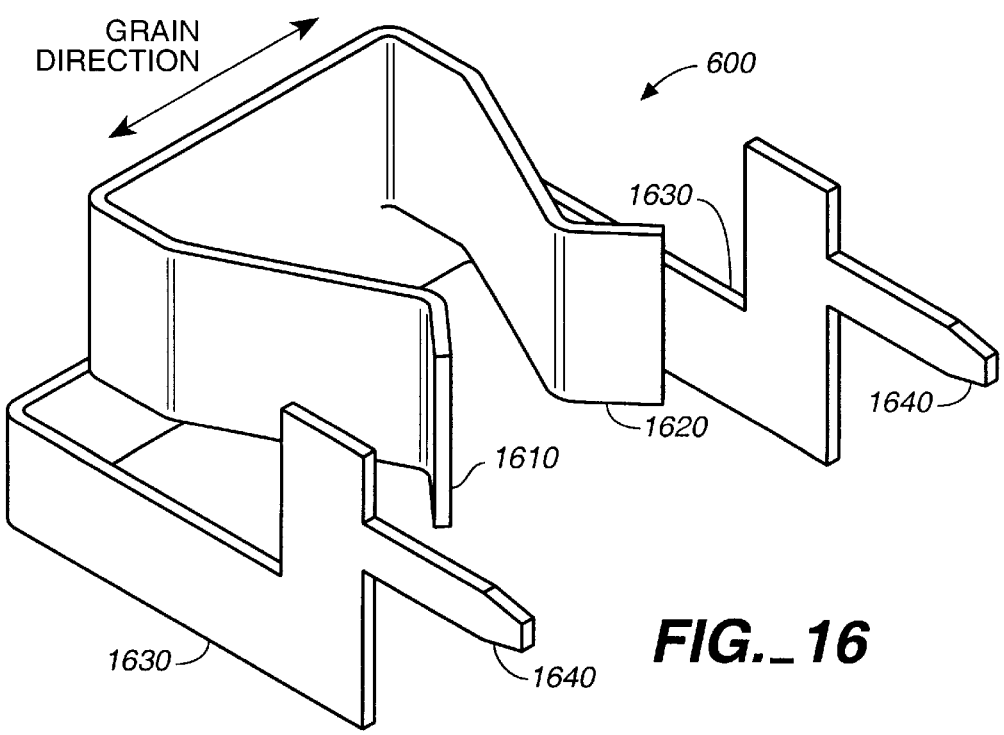
FIG._16

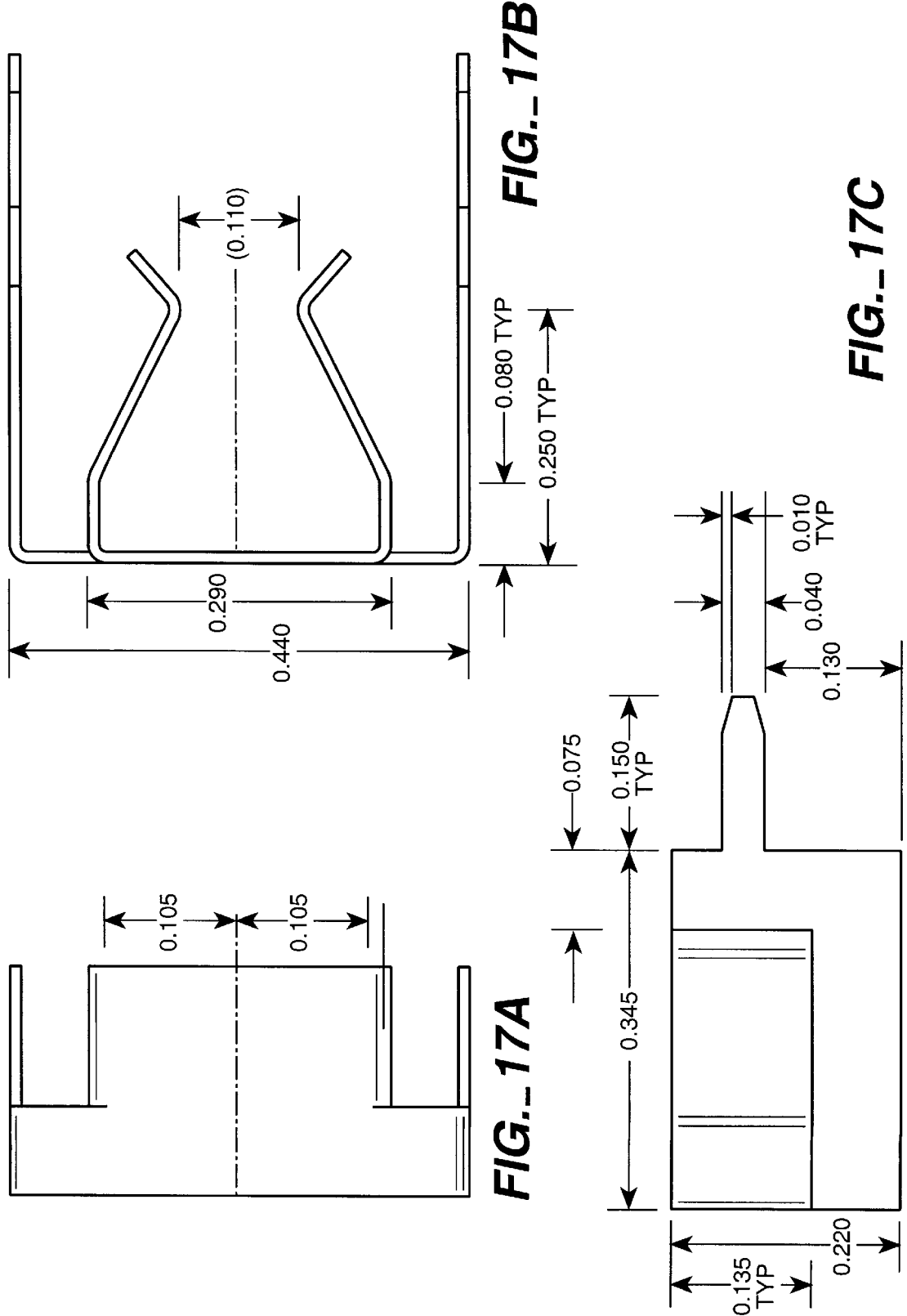

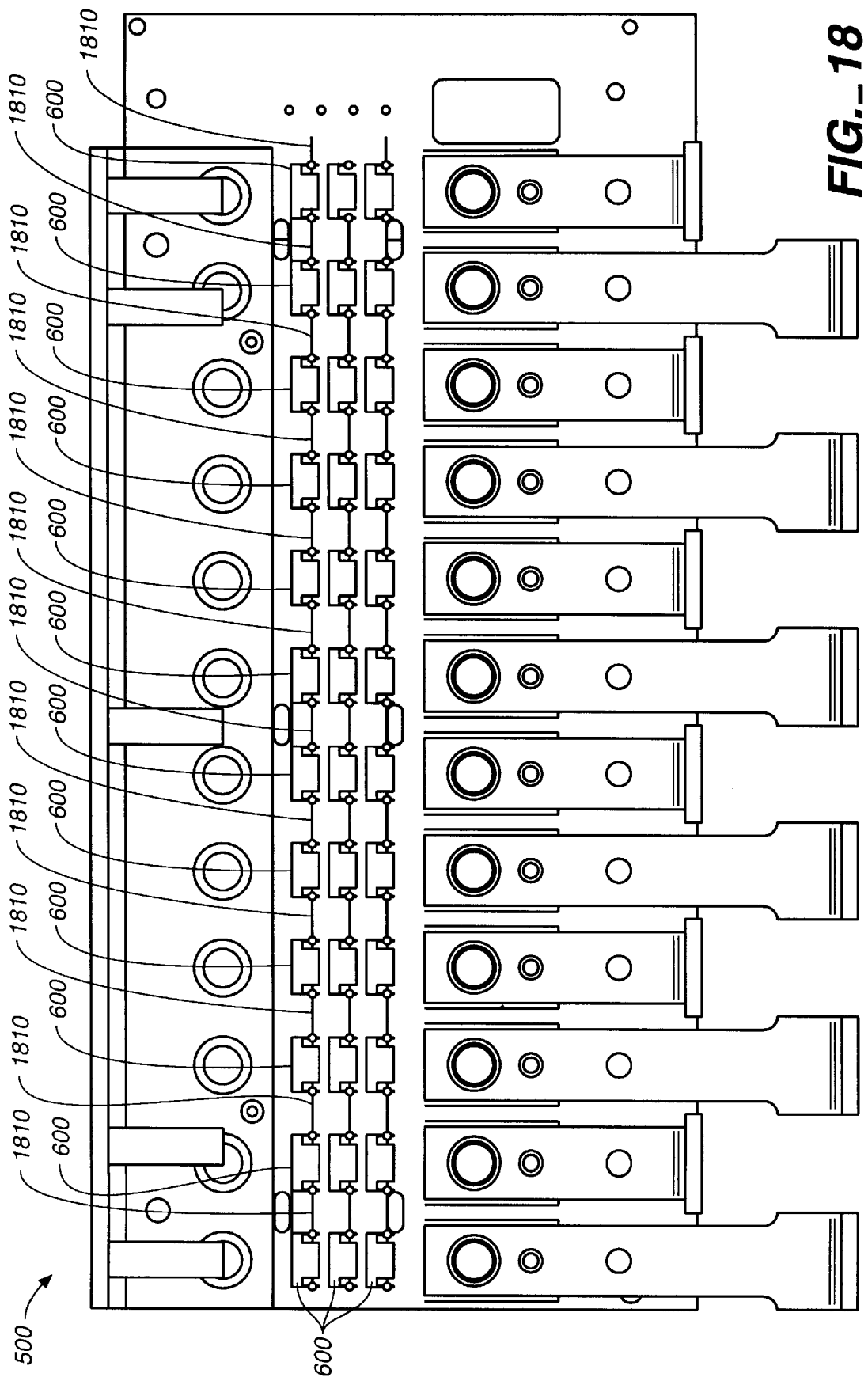
FIG._18

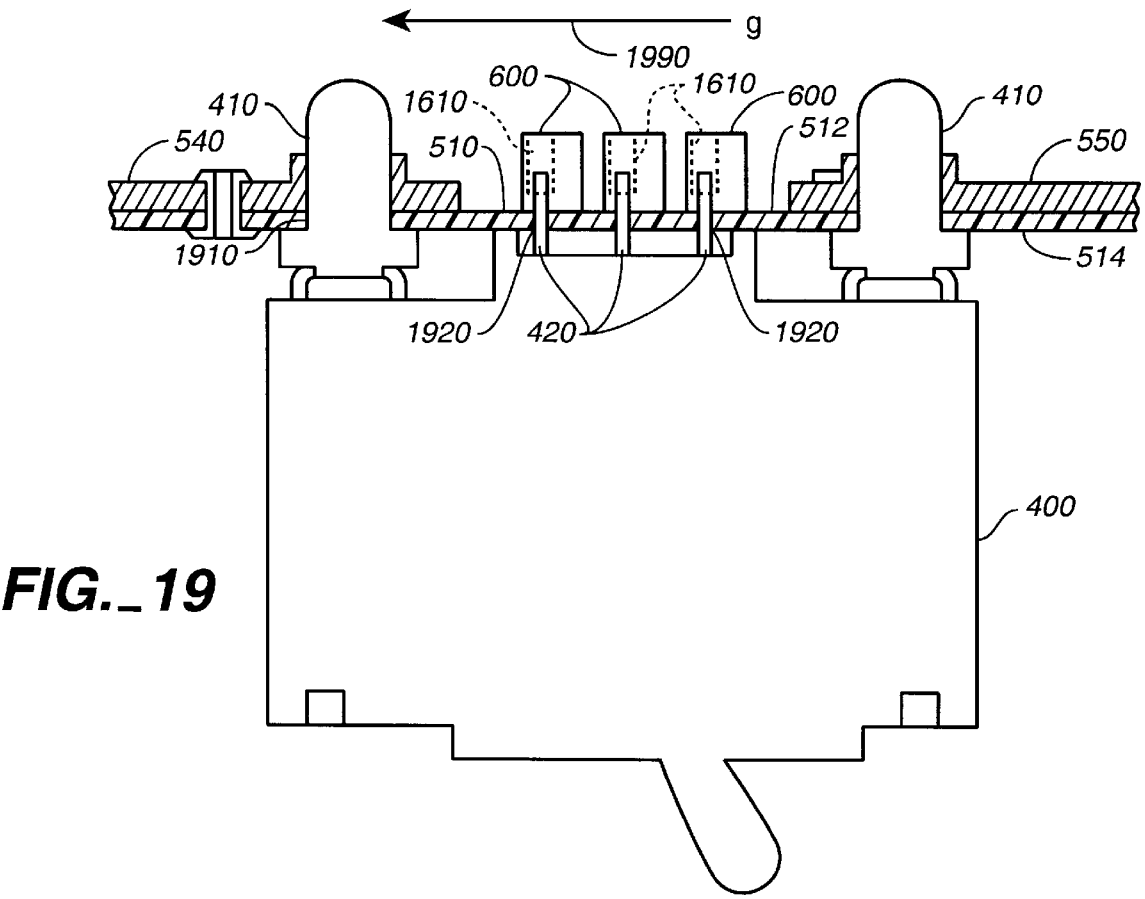
FIG._19
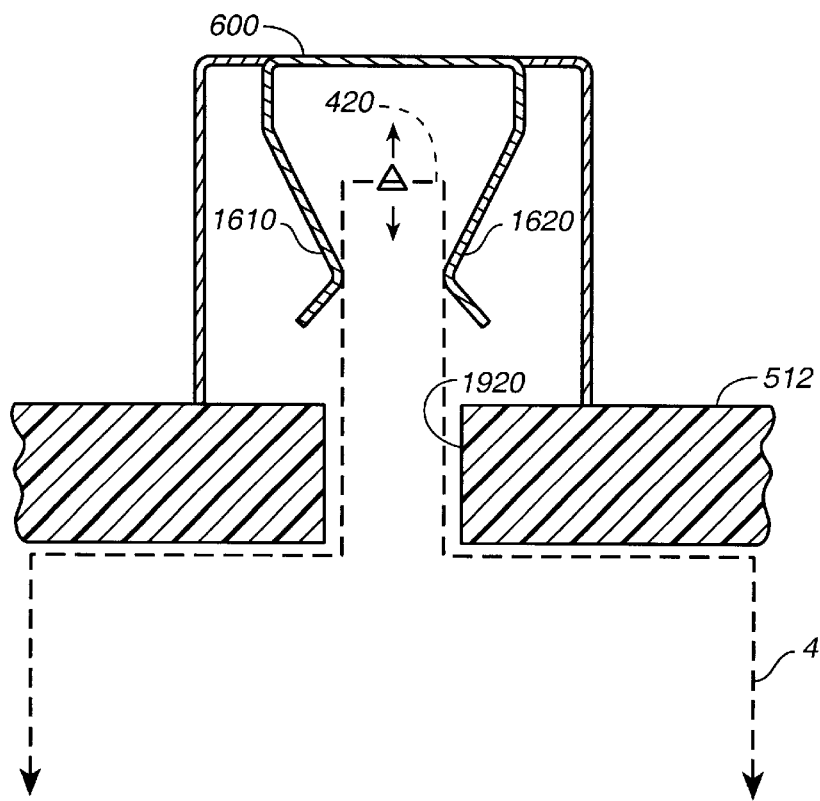
FIG._20

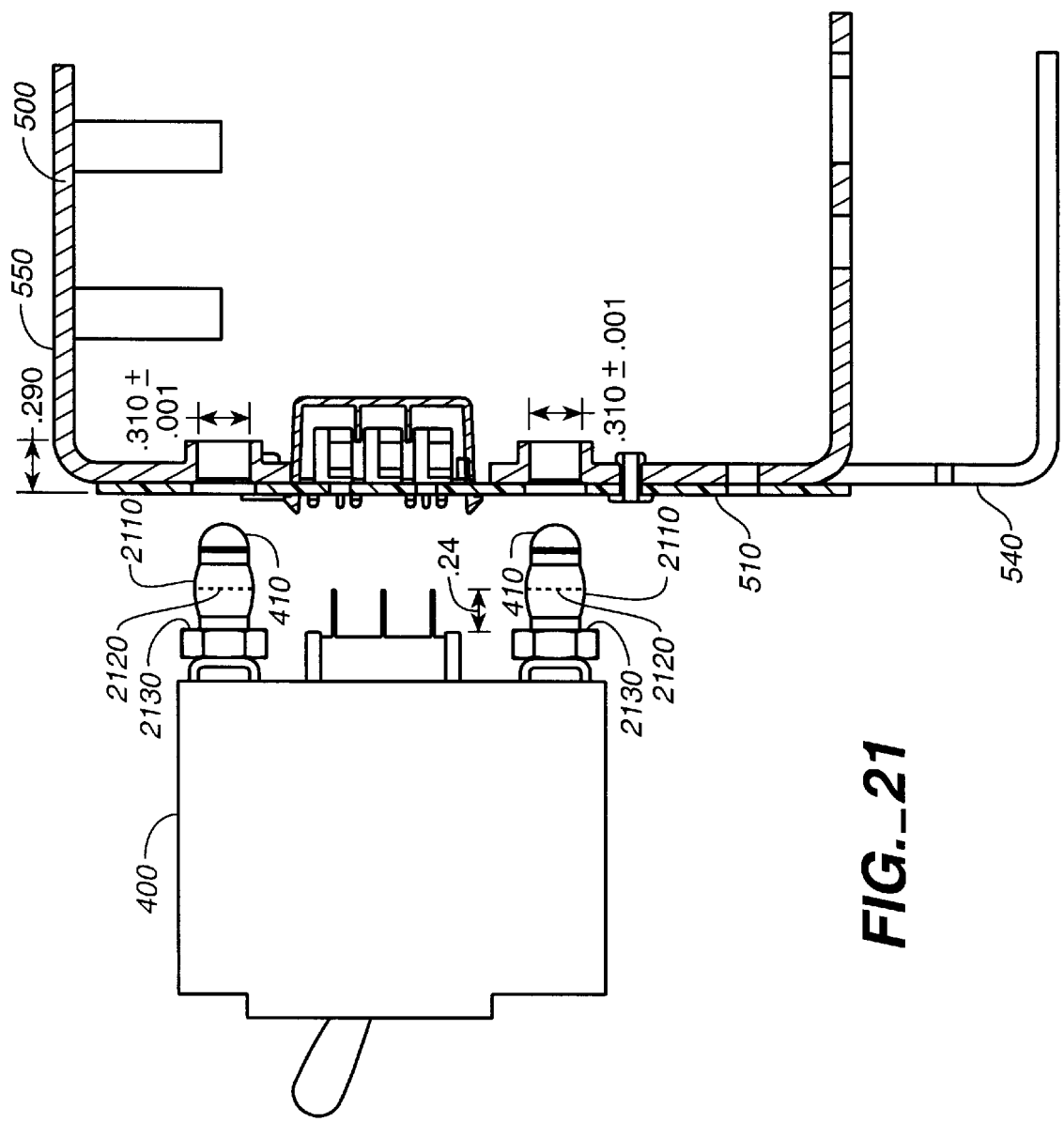
FIG._21

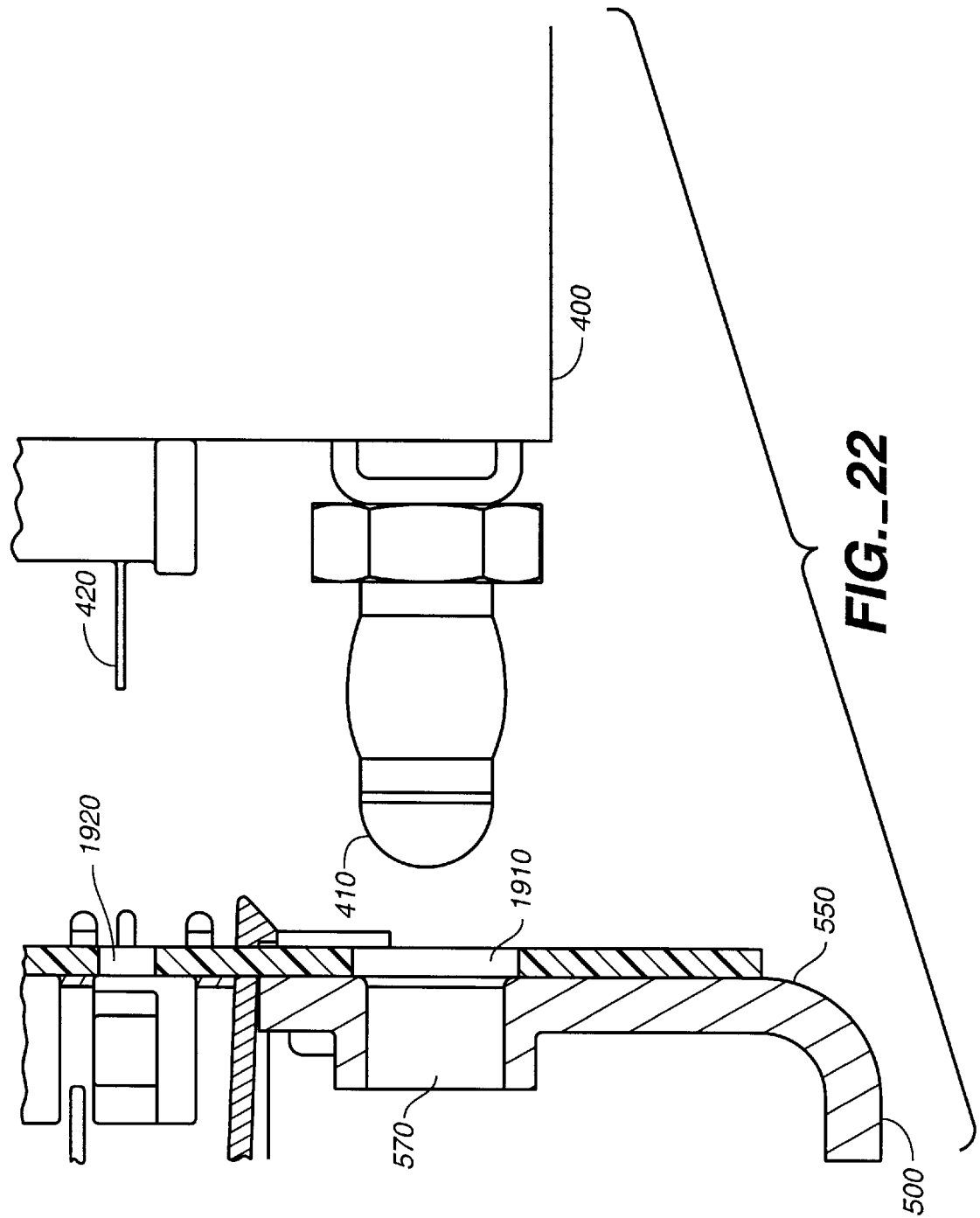
FIG._22

PCB CONNECTOR MODULE FOR PLUG-IN CIRCUIT BREAKERS AND FUSES

FIELD OF THE INVENTION

The present invention relates generally to an electrical connector module for mounting a plurality of overcurrent protection devices, such as circuit breakers or fuses. More particularly, the present invention is directed to a connector module for mounting a plurality of plug-in circuit breakers, wherein the connector module contains female plugs for line and load male plugs, also known as positive and negative power terminals, along with female plugs for auxiliary alarm contact terminals.

BACKGROUND OF THE INVENTION

There are numerous electrical system applications which require the use of a plurality of overcurrent protection devices, such as circuit breakers or fuse modules, to shut off current in one or more portions of the electrical system in response to an overcurrent condition. Fuses typically have a conductive wire element that rapidly heats and melts in response to an overcurrent condition, forming an open circuit. Fuses are often packaged in fuse modules containing additional circuit elements which transmit an alarm signal if the fuse opens in response to an overcurrent condition. Circuit breakers commonly comprise a movable electrical breaker contact and a stationary breaker contact. The movable electrical contact is typically coupled to an actuator mechanism that utilizes an electromagnetic device to open the breaker contacts when an over-current condition is detected. During normal circuit operation the actuator mechanism electrically couples the breaker contacts so that the circuit breaker is in a conducting, or on-state. However, when an over-current condition is detected, the circuit breaker trips, and enters a non-conducting, or off-state. A handle on the external surface of the circuit breaker is commonly coupled to the actuator mechanism. The actuator-handle provides a visual indication of the state of the circuit breaker (e.g., on, tripped, and off) while also permitting the user to reset the circuit breaker after the circuit breaker has been tripped or to deliberately turn the circuit breaker off during routine repair or maintenance. Some circuit breakers include an additional alarm circuit, which sends an alarm signal to other circuits when the alarm circuit senses that the circuit breaker has been tripped.

FIG. 1 shows a perspective view of a prior art circuit breaker module 100 used in a power distribution module. A plurality of circuit breakers 110, 120, 130 are coupled by frictional forces or by mechanical connectors to base 180 and front face plate 122. Each circuit breaker 110, 120, 130 has a corresponding actuator handle 105. As shown in FIG. 1, screw connectors 131 are commonly used to electrically couple circuit breakers 110, 120, 130 to busbars 162, 164 and connectors 160, 161, 151 to couple current to a rear connector 134 on panel 124. Bus bars 162, 164 couple a negative polarity power terminal, often called a line terminal, of each circuit breaker 110, 120, 130 to a negative power terminal. Connectors 160, 161, 151 separately couple the load terminal, often called the positive power terminal, of each circuit breaker 110, 120, 130 to separate electronic loads.

While circuit breaker module 100 provides the benefit of several circuit breakers 110, 120, 130 arranged to control the current or power in different portions of a power distribution module, it has several drawbacks. One drawback is that it may be inconvenient to replace one of the circuit breakers 110, 120, 130. Replacement of circuit breakers may be required if a circuit breaker is damaged. Additionally, circuit breakers may need to be replaced if it is determined that a different response is required by the circuit breaker. For example, the user may determine that a higher amperage circuit breaker is required for a particular application. The time to replace a circuit breaker 110, 120, 130 in module 100 may be significant because the total time to replace a circuit breaker includes the time to: 1) withdraw the module; 2) remove any exterior housing elements surrounding the screw connectors 131; 3) disconnect the screw connectors 131; 4) extract the old circuit breaker; 5) insert a new circuit breaker; 6) connect screw connectors 131 to the new circuit breaker; 7) attach any exterior housing elements; and 8) re-insert module 100.

Another drawback with circuit breaker module 100 is that the housing and connector are comparatively bulky. There is a general trend to miniaturize all aspects of power supply and power distribution systems. Unfortunately, the total volume of circuit breaker module 100, including connectors 131; busbars 162, 164; and connectors 160, 161, 151 is significant.

Still another drawback with module 100 is that it does not address the problem of circuit breakers with alarm circuits. Circuit breakers with alarm circuits typically have additional auxiliary terminals for sending an alarm signal that is indicative of the operating state of the circuit breaker. For example, an alarm circuit preferably sends a logical "high" signal from an alarm terminal to indicate that the circuit breaker has been tripped due to an overcurrent event. The alarm signal may, for example, be used to trigger an indicator light to alert the user that a circuit breaker has been tripped. Circuit breakers have two alarm contact terminals. More commonly, however, circuit breakers have three alarm contact terminals corresponding to normal-off, normal-closed, and common terminals. An electrical connection must be provided to each alarm contact terminal of each circuit breaker of a circuit breaker module. Unfortunately, this increases the complexity of the electrical connection required in a circuit breaker module.

FIG. 2 is a prior art side-view drawing of a circuit breaker 210 with an alarm circuit 220 providing an alarm signal via stab-type alarm terminal 216. Line contact 212 and load contact 214 also comprise stab-type connectors. Stab-type connectors are a type of connector that has a comparatively thin, blade-like connector surface which is pressed into a female connector slot or socket "(i.e., stabbed)" to form a tight mechanical and electrical coupling. Stab-type connectors have the advantage that the small surface area of a male stab-type connector permits a significant penetration pressure to be applied in inserting the male connector. However, stab-type connectors have the disadvantage of having a comparatively small cross-sectional area for current to flow.

FIG. 3A is a perspective view of a prior art circuit breaker module 254 designed to be loaded with a plurality of circuit breakers 210 having stab-type line and load terminal connectors 212, 214 (not shown) and stab-type alarm contact terminal connectors 216 (not shown) as illustrated on the circuit breaker 210 of FIG. 2. For the purposes of illustration, three circuit breakers 210 are shown installed in a module 254 designed to hold a total of four circuit breakers. A busbar 288 is used to provide an electrical connection to line contacts 212. Contacts 256 are spring-biased receptacles configured to contact load contacts 214. Additional connector legs 282 facilitate installation of module 254 as an integral unit.

FIG. 3B is a top view of module 254 with circuit breaker 210 removed, to more clearly show the electrical connectors.

Each aperture 260 allows passage of a line contact 212 (not shown) in order to receive power from a power source spring biased alarm contacts 262 are dimensioned to mate with corresponding alarm terminals 216 (not shown). The alarm contacts 262 are electrically connected to each other by alarm contact line 264 to respective circuit breakers 210. Load connectors 258 provide a bolt and screw connection site to secure external electrical lines.

While circuit breaker module 254 provides several benefits, it has several drawbacks. One drawback of stab-type connectors is that they have a limited structural strength, i.e., the comparatively small cross-sectional area of each stab-type terminal 212, 214 provides only limited resistance to transverse and rotational forces. However, if circuit breaker 210 is mounted to a socket perpendicular to a vertical surface, the force of gravity will generate transverse and rotational forces acting to dislodge the stab-type connectors. This may necessitate the use of long stab-connectors with a high contact pressure, which increases the difficulty of inserting or removing a circuit breaker. In some cases, additional support structures, such as a frame and screw connectors, are required to maintain a circuit breaker with stab-type connectors within their sockets. Another drawback with circuit breaker connector module 254 is that it does not address the need for reducing the cost per electrical connection. The cost of circuit breakers, like other electronic components, continues to decrease over time. It is desirable that the cost of the connector module divided by the number of circuit breakers decreases as the connector module is increased in size to accommodate a larger number of circuit breakers. This is commonly known as "increasing returns to scale." Stab connector receptacles 256, 262 will tend to have a substantially constant price per female receptacle, assuming that they are purchased from a commercial vendor in large production lots. However, as can be seen in FIGS. 3A and 3B, circuit breaker module 254 requires a substantial support structure including connector legs 282 and support surfaces 284 to facilitate removing or installing module 254 as an assembled unit into an electrical system. The material cost of the support structure will tend to increase as the module 254 is increased in size to connect additional circuit breakers. Consequently, it can be expected that there will be no significant cost reduction to increasing the size of module 254 to accommodate additional circuit breakers.

The need for a compact, low-cost circuit breaker connector module is especially important in the context of plug-in circuit breakers. As shown in FIG. 4, compact plug-in circuit breakers 400 commonly have power connections comprised of male plug-shaped connectors 410. Additionally, plug-in circuit breakers commonly include additional alarm contact terminal connectors 420 for transmitting an alarm signal. Typically there are three alarm contact terminals 420 corresponding to a common terminal, a tripped signal terminal, and an off-terminal. The alarm contact terminals may be any style of male plug, but are typically in the form of pins, prongs, or blades with planar surfaces.

It is desirable in many applications, such as telecommunication applications, to utilize a large number (e.g., ten to twenty) of plug-in circuit breakers 400 as part of a power distribution system. Unfortunately, there is no commercially available connector module that provides electrical connections to both the male plugs 410 and alarm contact terminals 420 of a single plug-in circuit breaker 400. Typically, separate wire connections are soldered to each of the alarm contact terminals 420 after the male plugs are plugged into two female socket receptacles.

Part of the problem of designing a connector module for a plug-in circuit breaker 400 is the different requirements of male plugs 410 and alarm contact terminals 420. The male plugs 410 of plug-in circuit breaker 400 preferably fit into female sockets (not shown in FIG. 4) with a friction fit so that the male plugs may be inserted or withdrawn in order to insert or remove the circuit breaker. In the context of circuit breakers without alarm contact terminals, this permits what is commonly known as "plug and play" operation, since both mechanical and electrical connection to the circuit breaker is made by inserting the plugs 410 into their sockets. However, the compact male alarm contact terminals 420 also require a reliable electrical connection in order to provide reliable alarm signals. Unfortunately, the differences in size, shape, and length of planar alarm contacts 420 compared with male plugs 410 make it difficult to design a low-cost connector socket that simultaneously mates with an appropriate friction fit to both types of male plugs 410 and auxiliary contact terminals 420.

The two different styles of male terminal connectors 410, 420 makes it difficult to achieve a friction fit with the appropriate connection length and pressure for both types of male connectors 410, 420 in a low-cost structure with reasonable fabrication tolerances. This problem is exacerbated in the context of circuit breaker modules in which the circuit breakers are mounted with the axis of the male connectors disposed perpendicular to the force of gravity, i.e., with the force of gravity acting to torque the male connectors. One potential solution to this problem is to use additional clamps or screws to apply a pressure between the male connectors and sockets. Clamps and screws are commonly used in some types of electrical connectors to facilitate the mating of different types of male connectors to a common female connector. However, additional clamps or screws increase the cost of the connector and also require the user to spend additional time to adjust the clamp or screws in order to remove or install the male connector. Moreover, clamps and screws are inconsistent with "plug and play" operation.

What is desired is a connector module for a plurality of overcurrent protection devices in which all of the male connectors of each overcurrent protection devices are demountably mounted to the female sockets of the connector module by friction coupling.

SUMMARY OF THE INVENTION

The present invention is directed towards a connector module for providing what is called "plug and play" electrical connections to a plurality of overcurrent protection devices in which the electrical connections to each overcurrent protection device are automatically made by inserting the overcurrent protection device into the connector module. The present invention generally comprises a connector module for mechanically mounting and providing electrical connections to a plurality of overcurrent protection devices each having first and second male electrical plugs, including: a mounting substrate having a first side and a second opposed side; first and second plug passageways disposed in said substrate for each overcurrent protection device, the plug passageways shaped and spaced apart from each other to permit the passage of the two male plugs of each overcurrent protection device through the passageways in the direction from the first side to the second side; a conductive load busbar member for each of the first plug passageways, each of the conductive members mounted by a mechanical connector to the second side of said substrate and having a socket shaped and positioned to mate with a friction fit with a corresponding male plug extending through the first connector passageway; and a conductive common busbar member mounted by a second mechanical connector to the second side of the substrate, the support member having a sockets shaped and positioned to mate with a friction fit with a corresponding male plug extending through the second connector passageway; wherein the substrate contains insulating surface regions on the first and second sides so that the first male plugs of each overcurrent protection device and their corresponding load busbar members are electrically insulated from the second male plugs and from each other.

A preferred embodiment of the connector module of the present invention is directed towards providing plug and play electrical connections to a plurality of circuit breakers, wherein each circuit breaker has both plug current connectors and auxiliary signal terminals. In the preferred embodiment, the mounting substrate is a printed circuit board and further comprises auxiliary signal terminal passageways and clips mounted to the second side of the substrate to provide an electrical connection to the auxiliary signal terminals.

One object of the present invention is a low-cost connector module adapted for plug-in circuit breakers with crown-style male plugs. In a preferred embodiment the sockets comprise protruded holes dimensioned to mate with crown-style male plugs.

Another object of the present invention is a low cost clip connector for making contact to auxiliary signal terminals. In a preferred embodiment, each clip is sized, shaped, and positioned to grasp a single auxiliary terminal whereas electrical connections to each clip are made by tracks on the substrate.

Still another object of the present invention is a low cost manufacturing method to fabricate the connector module.

These and other objects of the present invention will become apparent to those skilled in the art from the following detailed description and from the detailed drawings.

BRIEF DESCRIPTION OF THE DRAWINGS

FIG. 1 is a perspective view of a prior art circuit breaker module.

FIG. 2 is a side view of a prior art circuit breaker including an alarm circuit and stab-type current and alarm terminals.

FIG. 3A is a perspective view of a prior art circuit breaker module for mounting a plurality of circuit breakers with stab-type terminals.

FIG. 3B is a top view of the female connector surface of the circuit breaker module of FIG. 3A with the circuit breakers removed.

FIG. 4 is a perspective view of a prior art plug-in circuit breaker with plug-type male current connector terminals and plate-type alarm contact terminals.

FIG. 5 is a front perspective view of the circuit breaker module of the present invention.

FIG. 6 is a rear perspective view of the circuit breaker module of the present invention.

FIG. 7B is a front view of the housing of FIG. 7A.

FIG. 8 is rear view of the circuit breaker module of FIG. 5.

FIG. 9 is a cross-sectional view of the circuit breaker module of FIG. 8 along line 9—9.

FIG. 10 is a cross-sectional view of the circuit breaker module of FIG. 8 along line 10—10.

FIG. 11 is a cross-sectional view of the circuit breaker module of FIG. 8 long line 11—11.

FIG. 12 is a perspective view of a conductive busbar member of the resent invention.

FIG. 13 is a top view of the busbar of FIG. 12.

FIG. 14 is a cross-sectional view of the busbar of FIG. 13 along line 14—14.

FIG. 15 is a side view of a conductive busbar member of the present invention.

FIG. 16 is a perspective view of a preferred embodiment of a conductive clip.

FIG. 17(*a*) shows a top view of the conductive clip of FIG. 16.

FIG. 17(*b*) shows a front view of the conductive clip of FIG. 16.

FIG. 17(*c*) shows a side view of the conductive clip of FIG. 16.

FIG. 18 is a rear view of the circuit breaker module of FIG. 6 showing in more detail conductive traces linking rows of conductive clips.

FIG. 19 is a detailed portion of the cross-section of FIG. 10.

FIG. 20 is a front view of a clip attached to a substrate showing an installed auxiliary signal terminal in phantom.

FIG. 21 is a cross section similar to FIG. 10 but showing a circuit breaker module adapted for circuit breakers having crown-style male plugs.

FIG. 22 is detailed portion of FIG. 21 showing in more detail a region around one plug and one alarm contact terminal of a circuit breaker about to be inserted into the circuit breaker module.

DETAILED DESCRIPTION OF THE INVENTION

Figure 7A:
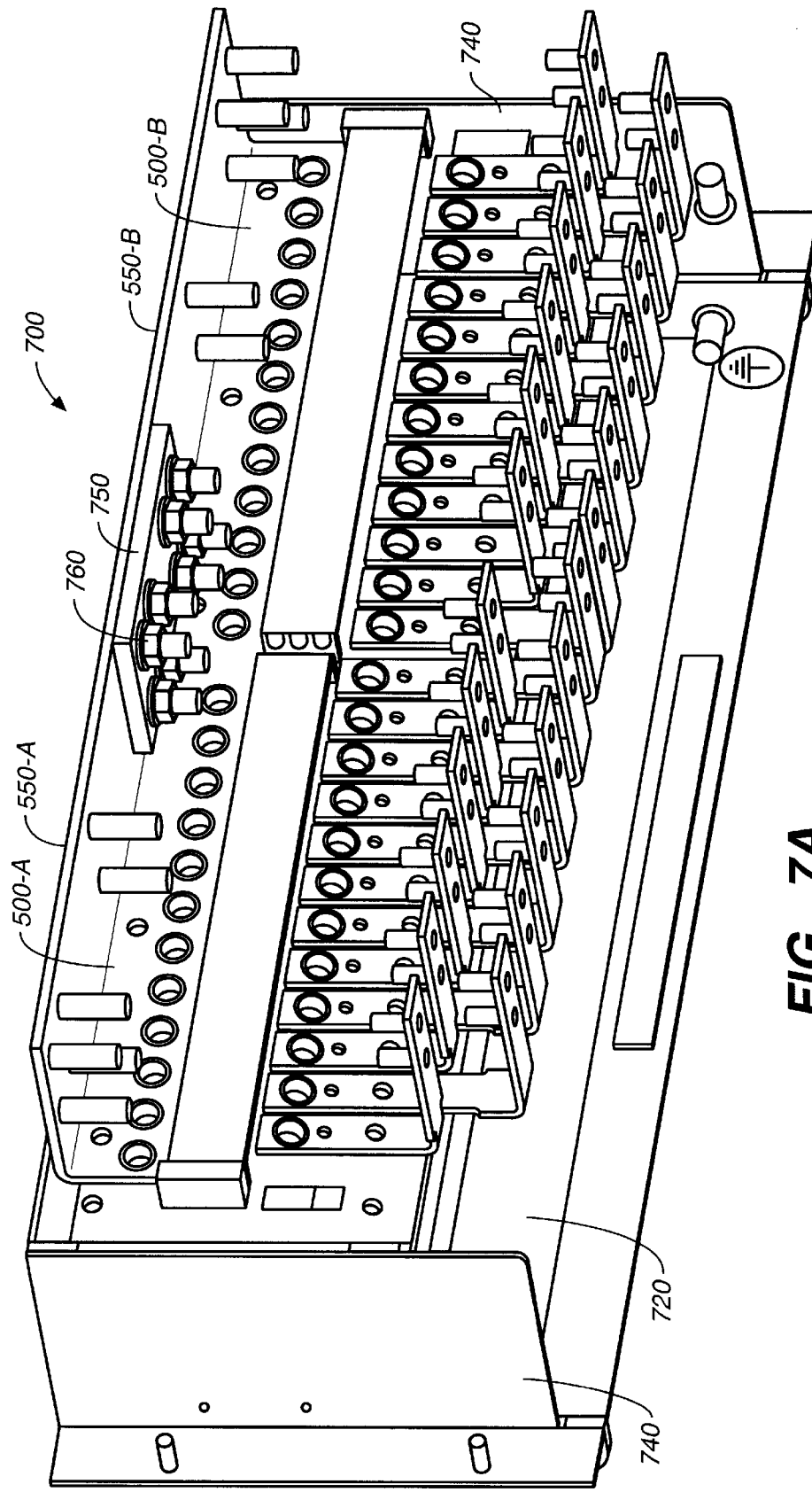
FIG. 7A shows a rear view of two circuit breaker modules of the present invention linked together in a housing.

The present invention generally comprises a connector module for overcurrent protection devices wherein each overcurrent protection device has male current plug connectors and male auxiliary signal terminals. One potential application for the inventive connector module includes its use as a connector module for fuse modules with auxiliary alarm signal terminals. Another potential application for the inventive connector module is for use with circuit breakers having auxiliary terminals used to perform a control function, such as circuit breakers with auxiliary terminals used to receive remote control signals (e.g., signals to reset or turn-off the circuit breaker). However, a preferred use for the connector module of the present invention is as a connector module for a plurality of plug-in circuit breakers having plug-type male current connectors and auxiliary male alarm contact terminals. Consequently, while the connector module of the present invention is shown and described in detail as being used with plug-in circuit breakers having alarm contact terminals, it will be understood that the connector module of the present invention includes applications as a connector module for a variety of overcurrent protection devices and that plug-in circuit breakers are merely exemplary devices.

FIG. 5 is a front perspective view of the circuit breaker module 500 of the present invention showing one installed circuit breaker 400. Module 500 comprises a mounting substrate 510, which is preferably a printed circuit board substrate, patterned with two spaced apart male plug passageways 520, 525 and signal terminal passageways 530 for each circuit breaker 400. The passageways 520, 525, 530 may be fabricated using any conventional printed circuit board fabrication process. There is one signal terminal passageway 530 for each auxiliary signal terminal of the circuit breaker. Modern printed circuit board fabrication processes permit extremely accurate selection of the location, diameter, and spacing of passageways 520, 525, 530. Plug passageways 520, 525 and signal terminal passageways 530 are shaped, dimensioned, and spaced apart so that corresponding male plug connectors 410 and auxiliary signal terminals 420 (shown in FIG. 4) may be inserted into the passageways 520, 525, 530. Passageways 520, 525 are preferably at least one-tenth of an inch larger in diameter than plugs 410, since this enables the passageways to assist to in aligning the plugs, i.e., the slightly larger diameter of the passageways 520, 525 compared with the plugs and sockets 570 (not shown in FIG. 5) assists the user aligning plugs 410 to the sockets 570 (shown in FIG. 6) disposed on the second side 512 of substrate 510. Generally, selecting the diameter of passageways 520, 525 to be several tenths (e.g., two or three) of an inch larger in diameter than plugs 410 provides an alignment benefit.

Module 500 has one conductive (load) busbar member 540 to couple load current from each circuit breaker 400. A conductive support 550 is configured to provide a common conductive (line) busbar member linking one terminal of each installed circuit breaker 400 to a common line current connection. Support 550 is a preferred design because support 550 may be used to mechanically couple module 500 to a housing (not shown in FIG. 5). However, the electrical function of support 550 could also be accomplished using a plurality of individual conductive busbar members (e.g., members similar to member 540) each individually coupled to a common line connection site. Additionally, in some applications it may be desirable to replace support 550 with a plurality of individual conductive busbar members (similar to member 540) which are not electrically coupled to each other. This may be useful, for example, in an application for which the circuit breakers are connected to different voltage sources so that both line and load power connections to the two plugs 410 of each circuit breaker are completely independent of each other.

Support 550 and members 510 are mechanically coupled to substrate 510 by mechanical connectors 560. Mechanical connectors 560 are preferably rivets, but may comprise any mechanical coupling device or fastener (e.g., epoxy) consistent with attaching support 550 and members 540 to substrate 510. Bolt hole connectors 590 permit support 550 to be bolted to a housing (not shown in FIG. 5) or attached to other elements.

As shown in FIG. 5, substrate 510 has a first side 514 and second side 512.

First side 514 is preferably a bare insulating surface, i.e., has no conductive metal in regions adjacent circuit breakers 400 to prevent deleterious shorting of circuit breaker contact terminals 410, 420.

FIG. 6 is a rear perspective view of module 500. Conductive clips 600 are disposed adjacent signal terminal passageways 530 above second surface 512 of substrate 510. Members 540 and support 550 have sockets 570, 575 dimensioned to mate with the plug terminals 410 of a plug-in circuit breaker 400 extending through plug passageways 520, 525. FIG. 6 shows, at far right, a plug terminal 410 of one installed circuit breaker extending through a socket 570 in a member 540. As can be seen in FIG. 6, members 540 are spaced apart from one another, i.e., do not touch one another. Members 540 are preferably in the shape of L-shaped members with a portion of the L-shaped member extending perpendicular from second surface 512 of substrate 510.

Second surface 512 of substrate 510 is preferably a bare (insulating) surface adjacent each member 540 so that the members are electrically isolated from one another and from support 550. However electrical traces, sometimes known as "tracks" are preferably disposed on second surface 512 adjacent to, and electrical coupled to, clips 600 in order to provide transmission paths (not shown in FIG. 6) for alarm signals from clips 600 to a signal receiving portion (not shown in FIG. 6) of substrate 510.

As shown in FIG. 5, a preferred design is for a module 500 designed to accept twelve plug-in circuit breakers 400. Limiting the number of circuit breakers 400 that module 500 accepts reduces the weight and stress upon substrate 500. This is desirable in order to increase the reliability of module 500, i.e., to prevent substrate 510 from cracking or warping during extended use. However, a module for mounting a larger number of circuit breakers may be achieved by mechanically coupling a plurality of individual modules 500 together. FIG. 7A is a rear perspective view of two circuit breaker modules 500-A, 500-B coupled by a plate 750 and bolts 760 to form a combined circuit breaker module 700. Support 500-A and 500-B are shown joined by a plate 750 and bolts 760. However, more generally, any conventional mechanical coupler may be used to physically couple two or more circuit breaker modules 500 into a larger unit capable of holding a larger number of circuit breakers than a single module 500. FIG. 7B is a front view of the housing of FIG. 7A. As shown in FIG. 7B, preferably additional housing segments 730, 740 and a front plate 720 coupled by screws 710 are used to house and support the combined module 700.

FIG. 8 is a rear view of module 500. FIG. 9 is cross-sectional view along line 9—9 of FIG. 8 showing a side view of an installed plug-in circuit breaker 400. FIG. 10 is a cross-sectional view along line 10—10 of FIG. 8 showing how the male plugs 410 and alarm contact terminals 420 are disposed in their respective sockets 570 and clips 600. FIG. 11 is a cross-sectional view along line 11—11 of FIG. 8, showing how the alarm contact terminal 420 of a circuit breaker 400 is inserted into clip 600.

FIG. 12 is a detailed perspective view of member 540. Socket 570 may comprise any style of electrical socket shaped to mate with a friction fit to a plug 410. This includes sockets with detents and other conventional mating surfaces shaped to mate with a male connector. However, referring to FIG. 4, plug in circuit breakers 400 are commonly sold with crown-style plugs 410 that are shaped to mate with a cylindrical hole of a predetermined length at what is commonly known as a connector "crown." Consequently, in a preferred embodiment socket 570 is substantially cylindrical in shape and with a diameter and length determined by the specific requirements of a crown-style plug 410. Generally, a crown-style plug 410 for common miniature plug-in circuit breakers requires a minimum socket length in order to achieve a proper mating of about 0.25 inches. Experiments by the inventors indicate that a protruded socket design, in which the average copper thickness is about one-eighth of an inch but which the protrusion has a cylindrical length of about one-quarter of an inch results in a substantial cost reduction, The member 540 shown in FIG. 12 is preferably formed with a protruded socket 570, since this results in about a factor of 3.5 lower manufacturing costs compared with manufacturing member 540 with a uniform thickness of copper and forming a cylindrical socket 570 by a drilling or reaming process. In a preferred manufacturing process, the protruded hole and all the cutting used to form member 540 are preferably performed on a dedicated progressive punch and die set. The ninety degree bend 1230 used to form the "L"-shape of members 540 is preferably made on a break press. Rivet holes 1210, 1220 permit member 540 to be riveted to substrate 510. FIG. 13 is a head-on view of member 540 showing preferred dimensions, in inches, for common plug-in circuit breakers. FIG. 14 is a cross-sectional view of socket 570 along line 14—14 of FIG. 13, showing preferred dimensions in inches. FIG. 15 is a side view of member 540 showing preferred dimensions in inches.

Clips 600 may be any type of clip which may be mounted on a mounting substrate (e.g., a printed circuit board) to form a female connector for auxiliary signal terminals and which has at least one contact region that supplies a sufficient pressure to maintain a reliable electrical connection to auxiliary signal terminals. A clip is commonly defined as a pinch-type connector in which a spring element acts to apply pressure to jaw or finger elements to form an electrical contact. In the art of printed circuit board fabrication, there are several structures that perform the function of providing contact surfaces that press upon a male shaft extended through a passageway in a printed circuit board. These structures are known by several names, including "integral electrical connectors" and "surface mountable socket connectors." Thus, clips 600 may alternately be described as a connector, or a socket connector, which includes spring contact elements. However, as used in this application the term "clip" describes the grasping function of clips 600 while avoiding potential confusion with the connector module 500 and with the male plug sockets 570.

Each individual clip 600 is preferably designed to minimize manufacturing costs. Studies by the inventors indicated that a plurality of clips 600 coupled by the conductive tracks of a printed circuit board results in over a five-fold reduction in cost of clip 600 compared with designing a large area connector socket to mate with the auxiliary contact terminals 420 of a large number of circuit breakers 400. In many applications it is desirable that each clip 600 has a contact pressure in the range of about 100 grams. A preferred clip design which achieves a contact pressure of about 100 grams is shown in FIGS. 16–17. As shown in the perspective view of FIG. 16, each clip 600 preferably has two finger segments 1610, 1620 dimensioned to mate with the surface of alarm contact terminals 420 with a significant contact pressure, e.g., about 100 grams. Finger segments 1610, 1620 are supported by legs 1630. Mounting feet 1640 are preferably structured to be inserted into substrate 510 and soldered into place. Legs 1630 and mounting feet 1640 are configured to provided a stable support for finger segments 1610, 1620. FIG. 17(*a*) shows a top view of clip 600 showing preferred dimensions in inches. FIG. 17(*b*) shows a front view of clip 600 showing preferred dimensions in inches. FIG. 17(*c*) shows a side view of clip 600 showing preferred dimensions in inches.

FIG. 18 is a rear view of module 500 showing clips 600 installed on the second surface 512 of substrate 510. Clips 600 are preferably soldered to conductive traces (also commonly known as "tracks") 1810 disposed on second surface 512, Traces 1810 may be formed by any conventional printed circuit board fabrication process. Traces 1810 are shown as electrically coupling rows of clip terminals together in a parallel arrangement (i.e., common terminals of each circuit breaker coupled together; normal-on signal terminals of each circuit breaker coupled together; and normal-off signal terminals of each circuit breaker coupled together). However, more generally traces 1810 may be configured to couple alarm signals from clips 600 in other ways, such as permitting an individual electrical connection to be made to each clip 600.

Some of the benefits of the present invention are illustrated in FIG. 19, which is detailed view of a portion of FIG. 10. As can be seen in FIG. 19, plugs 410 extend through plug passageways 1910 in substrate 510 and mate with sockets 570 in member 540 and support 550. Sockets 570 are preferably protruded holes shaped to provide a friction fit with plugs 410. The diameter and length of the protruded holes forming sockets 570 may be selected to obviate the need for additional mating surfaces. Generally, selecting the diameter of the sockets 570 to be only slightly larger than that of the plugs 410 facilitates forming a reliable mechanical and electrical connection. Additionally, the length of the protruded hole is another consideration. For circuit breakers 400 with crown-style plugs 410, the length of the protruded holes should be selected to mate with the crown of the plug.

The design of clips 600 facilitates reliable electrical connections to auxiliary contact terminals with relaxed placement tolerances. As can be seen in FIG. 19, auxiliary alarm contact terminals 420 extend through signal terminal passageways 1920. Alarm contact terminals 420 are grasped by fingers 1610, 1620 (finger 1610 shown in phantom) of clip 600 proximate a distal end of each alarm contact terminal 420. Referring to FIG. 20, which shows a front view of a clip 600 and an inserted alarm contact terminal 420 shown in phantom, it can be seen that the alarm contact terminal will make contact with fingers even though it may be displaced up or down by a distance $\pm\Delta/2$. Finger contacts 1610, 1620 are also insensitive to small lateral displacements of alarm contact terminal 420 in passageway 1920. Referring again to FIG. 19, when a user inserts plugs 410 into sockets 570 so that a friction fit is formed between male plugs 410 and sockets 570, finger contacts 1610, 1620 of each clip will automatically grasp alarm contacts 420 in spite of small vertical and lateral displacements of alarm contact terminals 420 caused by manufacturing tolerance of plugs 410 and sockets 570. Additionally, finger contacts 1610, 1620 are insensitive to small angular shifts caused by a slight (e.g., one degree) tilt of circuit breaker 400 caused by the force of gravity (shown in FIG. 19 by arrow 1990) producing a torque on the installed circuit breaker.

Referring to FIGS. 19–20, the present invention permits what is called "plug and play" installation or replacement of a circuit breaker. No additional clamps or bolts are required to install the circuit breaker. The sockets 570 may be dimensioned to permit installation or removal of the circuit breaker with a reasonable force, i.e., consistent with the hand strength of the average user and without overstressing substrate 510.

FIG. 21 shows a cross-sectional view, similar to that of FIG. 19, for a circuit breaker 400 having crown-style plugs 410, showing preferred dimensions in inches. Each crown-style plug has a metallic crown terminal section 2110, typically comprised of a layer of plated gold. In order to ensure a reliable electrical connection, each plug must be inserted into a cylindrical socket 570 beyond the center of the crown terminal (shown in phantom as line 2120). For one common style of crown-style plug, this distance, as measured from the base 2130 of the plug corresponds to a distance of 0.24 inches, as shown in FIG. 21. As can be seen in FIG. 21, the total thickness of substrate 510 through the protruded hole socket 570 corresponds to a length of about 0.290 inches, which results in proper mating of the crown-style plug 410. FIG. 22 is a detailed view of a portion of FIG. 21. As can be seen in FIG. 22, plug passageway 1910 is slightly larger in diameter than cylindrical socket 570, which facilitates mating. Also, alarm contact signal terminals 420 have a width less than that of passageways 1920 in order to facilitate their insertion.

It will be recognized that the connector module of the present invention may also be used with electronic devices which do not have auxiliary terminals, such as conventional plug-in fuses and circuit breakers without alarm terminals. It will also be recognized that sockets 570 may be shaped to mate with a variety of different shaped male connectors. It will also be recognized that while clips 600 are shown as being designed to mate with alarm contact terminals 420 having planar surfaces, more generally any male/female clip mating configuration may be used to accommodate changes in the shape of alarm contact terminals 420. Moreover, while circuit breakers 400 are currently commonly sold with male alarm contact terminals 420, it will be recognized that plug-in circuit breakers 400 with female alarm contact terminals 420, although less desirable, are technically possible. Connector module 500 may be adapted for use with plug-in circuit breakers 400 having female alarm contact terminals 420 by replacing clip 600 with any conventional male clip or socket which may be mounted to a mounting substrate to form a male/female connection with female alarm contact terminals.

In summary, the present invention comprises a connector module for over-current protection devices. The connector module addresses the need for a low-cost plug and play connector module for plug-in circuit breakers having male line and load current plugs and additional auxiliary signal terminals. The use of a printed circuit board as a support substrate for busbars and alarm contact clips results in a low manufacturing cost. In a low cost manufacturing process, load busbar members are formed from copper strips with protruded sockets and riveted onto the substrate. A common (line) busbar forms a support member and is also riveted to the substrate. Contacts to auxiliary alarm contact terminals are made using a plurality of clips mounted to the substrate, wherein tracks on the printed circuit board substrate are used to make electrical contact to the clips.

Although a preferred embodiment of the present invention and modifications thereof have been described in detail herein, it is to be understood that this invention is not limited to those precise embodiments and modifications, and that other modifications and variations may be affected by one of ordinary skill in the art without departing from the spirit and scope of the invention as defined in the appended claims.

What is claimed is:

1. A connector module for mechanically mounting and providing electrical connections to a plurality of overcurrent protection devices each having first and second male electrical plugs and an auxiliary signal terminal, comprising:
   a mounting substrate having a first side and a second opposed side;
   a signal terminal passageway disposed in said substrate for each overcurrent protection device, each said signal terminal passageway extending from said first side to said second side and shaped and positioned to permit the passage of the auxiliary signal terminal of a corresponding overcurrent protection device from said first side to said second side;
   a conductive clip for each signal terminal passageway, each said clip mounted to the second side of the substrate adjacent one of said signal terminal passageways and having contact surfaces shaped and dimensioned to make electrical contact with one of the auxiliary signal terminals; and
   at least one electrical trace disposed on one of said sides of the substrate and electrically coupled to each said clip to form at least one transmission path for signals;
   first and second plug passageways disposed in said substrate for each overcurrent protection device, said plug passageways shaped and spaced apart from each other to permit the passage of the two male plugs of each overcurrent protection device through said passageways in the direction from the first side to the second side;
   a conductive load busbar member for each of the first plug passageways, each said load busbar member mounted to the second side of said substrate and having a socket shaped and positioned to mate with a friction fit with a corresponding first male plug extending through said first plug passageway; and
   at least one conductive line busbar member mounted to the second side of said substrate and having at least one socket shaped and positioned to mate with a friction fit with a corresponding second male plug extending through a second passageways;
       wherein said substrate contains insulating surface regions on said first and second sides so that the first male plugs of each overcurrent protection device and their corresponding load busbar members are electrically insulated from said second male plugs and from each other.

2. The connector module of claim 1, wherein the over-protection devices comprise plug-in circuit breakers with crown-style male plugs and the sockets in the busbar members are cylindrical.

3. The connector module of claim 1, further comprising a housing mechanically configured to support said substrate.

4. The connector module of claim 1, comprising:
   a plurality of additional signal terminal passageways disposed in said substrate for each of said overcurrent protection devices, said plurality of additional signal terminal passageways extending from said first side to said second side and shaped and positioned to permit the passage of a corresponding plurality of additional auxiliary signal terminals of each of said overcurrent protection devices from said first side to said second side; and
   a plurality of additional conductive clips for each of said additional signal terminal passageways, said plurality of additional clips mounted to the second side of the substrate adjacent a corresponding plurality of additional signal terminal passageways and having contact surfaces shaped and dimensioned to make electrical contact with a corresponding plurality of additional auxiliary signal terminals.

5. The connector module of claim 1, wherein each clip comprises two finger segments supported by legs mounted to the substrate.

6. The connector module of claim 5, wherein said finger segments apply a spring force to an installed auxiliary signal terminal.

7. The connector module of claim 6, wherein the finger segments apply a force in the range of 100 grams.

8. A connector module for mechanically mounting and providing electrical connections to a plurality of overcurrent protection devices each having first and second male electrical plugs for conducting a load current and an auxiliary signal terminal, comprising:

a mounting substrate having a first side and a second opposed side;

a signal terminal passageway disposed in said substrate for each overcurrent protection device, each said signal terminal passageway extending from said first side to said second side and shaped and positioned to permit the passage of the male auxiliary signal terminal of a corresponding overcurrent protection device from said first side to said second side;

a conductive clip for each signal terminal passageway, said clips mounted to the second side of the substrate adjacent each signal terminal passageway and having contact surfaces shaped and positioned to make electrical contact with one of the auxiliary signal terminals;

at least one electrical trace disposed on one of said sides of the substrate and electrically coupled to said clips to form at least one transmission path for signals;

first and second plug passageways disposed in said substrate for each overcurrent protection device, said plug passageways shaped and spaced apart from each other to permit the passage of the two male plugs of each overcurrent protection device in the direction from the first side to the second side;

a conductive load busbar member for each of the first plug passageways, each said conductive member mounted by a mechanical connector to the second side of said substrate and each having a socket shaped and positioned to mate with a friction fit with a corresponding first male plug extending through said first plug passageway; and a conductive common busbar support member mounted by a second mechanical connector to the second side of said substrate, said support member having a plurality of sockets shaped, dimensioned, and positioned to mate with a friction fit with corresponding second male plugs extending through said second plug passageways;

wherein said substrate contains insulating surface regions on said first and second sides so that the first male electrical connector of each overcurrent protection device and their corresponding busbar members are electrically insulated from said second male plugs and from each other.

9. The connector module of claim 8, wherein at least one of the plurality of overcurrent protection devices is selected from the group consisting of fuses and fuse modules.

10. The connector module of claim 8, further comprising a housing mechanically coupled to said support member and configured to substantially support said substrate.

11. The connector module of claim 8, wherein the overcurrent protection device is a circuit breaker.

12. The connector module of claim 11, wherein said circuit breaker has crown-style male plugs and the sockets are cylindrical.

13. A connector module for mechanically mounting and providing electrical connections to a plurality of circuit breakers each having first and second male electrical plugs and an auxiliary signal terminal, comprising:

a mounting substrate with a first side and a second opposed side;

signal terminal passageway means for enabling signal terminals of each circuit breaker to extend through the substrate from the first side to the second side;

a plurality of clips configured to provide an electrical connections to each auxiliary signal terminal of each circuit breaker to be coupled thereto;

passageway means for enabling the male plugs of each circuit breaker to extend through the substrate from the first side to the second side;

a plurality of busbars mounted on the second side of the substrate, said plurality of busbars, including socket means for mechanically mounting and providing electrical connections to the male plugs of each circuit breaker to be coupled thereto.

14. A method of fabricating a connector module for mechanically mounting and providing electrical connections to a plurality of circuit breakers each having two male current plugs and an alarm contact terminal, comprising the steps of:

a) providing a printed circuit board substrate having a first side and a second side;

b) forming first and second plug passageways from said first side to said second side shaped and dimensioned to permit the passage of the first and second male connector plug;

c) forming a conductive strip composed of a malleable metal into a metal strip;

d) forming a protruded socket in the conductive strip shaped and dimensioned to mate with the male connector with a friction fit;

e) fastening the conductive strip to said second side of said substrate so that the protruded socket is aligned with one of the plug passageways;

f) forming a plurality of alarm contact terminal passageways extending from said first side to said second side shaped to permit the passage of the male alarm contact terminal of each of the circuit breakers;

g) providing a plurality of connector clips;

h) forming a conductive trace on one of said sides of the printed circuit board;

i) mounting one clip above each alarm contact terminal passageway; and j) forming a conductive connection to each clip and the conductive trace so that an electrical connection is made to each clip.

15. The method of claim 14, wherein each of said clips has first and second finger segments shaped to receive the male alarm contact terminal of each circuit breaker, the clips having conductive support legs shaped and dimensioned so that the clips may be mounted to the printed circuit board with the finger segments disposed above a surface of the printed circuit board.

* * * * *